US012811649B2

(12) United States Patent
Chen et al.

(10) Patent No.: US 12,811,649 B2
(45) Date of Patent: Nov. 24, 2026

(54) METHOD AND DEVICE FOR RECEIVING AND TRANSMITTING INFORMATION

(71) Applicant: Samsung Electronics Co., Ltd., Suwon-si (KR)

(72) Inventors: Zhe Chen, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 18/618,092

(22) Filed: Mar. 27, 2024

(65) Prior Publication Data

US 2024/0340055 A1 Oct. 10, 2024

(30) Foreign Application Priority Data

Apr. 4, 2023 (CN) ........................ 202310355944.X
May 8, 2023 (CN) ........................ 202310512998.2

(51) Int. Cl.
*H04B 7/06* (2006.01)
*H04W 72/0457* (2023.01)
(Continued)

(52) U.S. Cl.
CPC ...... *H04B 7/0626* (2013.01); *H04W 72/0457* (2023.01); *H04W 72/1268* (2013.01); *H04W 72/1273* (2013.01); *H04W 80/02* (2013.01)

(58) Field of Classification Search
CPC .... H04B 7/0626; H04L 5/0057; H04W 24/10; H04W 72/0457
See application file for complete search history.

(56) References Cited

U.S. PATENT DOCUMENTS

2019/0215712 A1 7/2019 Babaei et al.
2022/0045902 A1 2/2022 Frenne et al.
(Continued)

FOREIGN PATENT DOCUMENTS

WO 2021/208007 A1 10/2021
WO 2022/238097 A1 11/2022
(Continued)

OTHER PUBLICATIONS

International Search Report dated Jul. 3, 2024, issued in International Application No. PCT/KR2024/003874.
(Continued)

*Primary Examiner* — Kevin M Cunningham
(74) *Attorney, Agent, or Firm* — Jefferson IP Law, LLP

(57) ABSTRACT

The disclosure relates to a 5G or 6G communication system for supporting a higher data transmission rate. A method and device for receiving and transmitting information are provided. A method performed by a user equipment (UE) in a communication system is provided. The method includes receiving, via higher layer signaling, a channel state information (CSI) report configuration list including at least one CSI report configuration, receiving a medium access control (MAC) control element (CE) including first information for activation/deactivation respectively of a plurality of configurations included in a CSI report configuration corresponding to the first information among the at least one CSI report configuration, and transmitting, on a physical uplink control channel (PUCCH), a CSI report including a CSI parameter based on a configuration activated by the first information.

20 Claims, 15 Drawing Sheets

(51) Int. Cl.

| | |
|---|---|
| ***H04W 72/1268*** | (2023.01) |
| ***H04W 72/1273*** | (2023.01) |
| *H04W 80/02* | (2009.01) |

(56) References Cited

U.S. PATENT DOCUMENTS

| | | | | |
|---|---|---|---|---|
| 2022/0353947 | A1 | 11/2022 | Babaei et al. | |
| 2023/0180225 | A1 * | 6/2023 | Babaei | H04W 72/54 370/329 |
| 2025/0038906 | A1 * | 1/2025 | Park | H04W 24/10 |
| 2025/0266879 | A1 * | 8/2025 | He | H04L 1/1812 |

FOREIGN PATENT DOCUMENTS

| | | | |
|---|---|---|---|
| WO | 2022/238929 | A1 | 11/2022 |
| WO | 2022/261923 | A1 | 12/2022 |

OTHER PUBLICATIONS

3rd Generation Partnership Project; Technical Specification Group Radio Access Network; NR; Medium Access Control (MAC) protocol specification (Release 17), 3GPP TS 38.321 V17.4.0 (Mar. 2023), Mar. 29, 2023.

3rd Generation Partnership Project; Technical Specification Group Radio Access Network; NR; Physical layer procedures for data (Release 17), 3GPP TS 38.214 V17.5.0 (Mar. 2023), Mar. 30, 2023.

3rd Generation Partnership Project; Technical Specification Group Radio Access Network; NR; Radio Resource Control (RRC) protocol specification (Release 17), 3GPP TS 38.331 V17.4.0 (Mar. 2023), Mar. 30, 2023.

Extended European Search Report dated Jun. 3, 2026; European Appln. No. 24785096.9-1206/4670291 PCT/KR2024003874.

* cited by examiner

METHOD AND DEVICE FOR RECEIVING AND TRANSMITTING INFORMATION

CROSS-REFERENCE TO RELATED APPLICATION(S)

This application is based on and claims priority under 35 U.S.C. § 119 (a) of a Chinese patent application number 202310355944.X, filed on Apr. 4, 2023, in the Chinese Intellectual Property Office, and of a Chinese patent application number 202310512998.2, filed on May 8, 2023, in the Chinese Intellectual Property Office, the disclosure of each of which is incorporated by reference herein in its entirety.

BACKGROUND

1. Field

The disclosure relates to a technical field of wireless communications. More particularly, the disclosure relates to a method and a device for receiving and transmitting information.

2. Description of Related Art

In order to meet the increasing demand for wireless data communication services since the deployment of 4$^{th}$ generation (4G) communication systems, efforts have been made to develop improved 5$^{th}$ generation (5G) or pre-5G communication systems. Therefore, 5G or pre-5G communication systems are also called "Beyond 4G networks" or "Post-long term evolution (LTE) systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

Transmission from a base station to a user equipment (UE) is called a downlink, and transmission from the UE to the base station is called an uplink.

5$^{th}$ generation (5G) mobile communication technologies define broad frequency bands such that high transmission rates and new services are possible, and can be implemented not only in "Sub 6 GHz" bands such as 3.5 GHZ, but also in "Above 6 GHz" bands referred to as mm Wave including 28 GHz and 39 GHz. In addition, it has been considered to implement 6$^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a network device (e.g., a network node) that flexibly (dynamically) changes parameters (such as a power parameter, a spatial domain parameter, and a frequency-domain parameter) thereof to adapt to requirements of UEs at different times, to enhance the scheduling flexibility of a 5G wireless communication system.

Additional aspects will be set forth in part in the description which follows and, in part, will be apparent from the description, or may be learned by practice of the presented embodiments.

In accordance with another aspect of the disclosure, a method performed by a user equipment (UE) in a communication system is provided. The method includes receiving, by the UE via higher layer signaling, a channel state information (CSI) report configuration list including at least one CSI report configuration, receiving, by the UE, a medium access control (MAC) control element (CE) including first information for activation/deactivation respectively of a plurality of configurations included in a CSI report configuration corresponding to the first information among the at least one CSI report configuration, and transmitting, by the UE on a physical uplink control channel (PUCCH), a CSI report including a CSI parameter based on a configuration activated by the first information.

In one example, the determining fourth information includes receiving signaling associated with the fourth information.

In one example, the method further includes receiving information for configuring a reference signal resource, wherein the signaling is associated with second information, and the reference signal resource is determined by the third information based on the information for configuring a reference signal resource.

In one example, the second parameter is based on the fourth information, which includes that the second parameter is indicated or updated by the fourth information.

In one example, the method further includes receiving second configuration information, wherein the second parameter is indicated or updated by the fourth information based on the second configuration information.

In one example, the second configuration information is associated with at least one of a cell and/or component carrier (CC) group, a cell and/or CC, a bandwidth part (BWP), a reference signal resource, a reference signal resource set, a CSI report associated with the reference signal resource, and the reference signal resource.

In one example, the reference signal resource includes a reference signal resource for channel measurement and/or a reference signal resource for interference measurement.

In one example, the reference signal resource includes a reference signal resource set for channel measurement and/or a reference signal resource set for interference measurement.

In one example, the spatial domain associated information includes codebook information and/or a reference signal port parameter.

In one example, the frequency-domain associated information includes frequency-domain information for CSI reporting associated with the reference signal resource and/or frequency-domain information for a measurement resource.

In one example, the measurement associated information includes measurement restriction information and/or a number of measurement reference signals to be reported.

In one example, the information for indicating a CSI report container includes information for carrying a CSI reporting resource.

In one example, the reference signal resource includes a periodic reference signal resource.

In accordance with another aspect of the disclosure, a method performed by a base station in a communication system is provided. The method includes transmitting, by the base station via higher layer signaling, a channel state information (CSI) report configuration list including at least one CSI report configuration, transmitting, by the base station, a medium access control (MAC) control element (CE) including first information for activation/deactivation respectively of a plurality of configurations included in a CSI report configuration corresponding to the first information among the at least one CSI report configuration, and receiving, by the base station on a physical uplink control channel (PUCCH), a CSI report including a CSI parameter associated with a configuration activated by the first information.

In accordance with another aspect of the disclosure, a user equipment (UE) in a communication system is provided. The UE includes a transceiver, memory storing one or more computer programs, and one or more processors communicatively coupled to the transceiver and the memory, wherein the one or more computer programs include computer-executable instructions that, when executed by the one or more processors, cause the UE to receive, via higher layer signaling, a channel state information (CSI) report configuration list including at least one CSI report configuration, receive a medium access control (MAC) control element (CE) including first information for activation/deactivation respectively of a plurality of configurations included in a CSI report configuration corresponding to the first information among the at least one CSI report configuration, and transmit, on a physical uplink control channel (PUCCH), a CSI report including a CSI parameter based on a configuration activated by the first information.

In accordance with another aspect of the disclosure, a base station in a communication system is provided. The base station includes a transceiver, memory storing one or more computer programs, and one or more processors communicatively coupled with the transceiver and the memory, wherein the one or more computer programs include computer-executable instructions that, when executed by the one or more processors, cause the base station to transmit, via higher layer signaling, a channel state information (CSI) report configuration list including at least one CSI report configuration, transmit a medium access control (MAC) control element (CE) including first information for activation/deactivation respectively of a plurality of configurations included in a CSI report configuration corresponding to the first information among the at least one CSI report configuration, and receive, on a physical uplink control channel (PUCCH), a CSI report including a CSI parameter associated with a configuration activated by the first information.

In accordance with another aspect of the disclosure, one or more non-transitory computer-readable storage media storing one or more computer programs including computer-executable instructions that, when executed by one or more processors of a user equipment (UE), cause the UE to perform operations are provided. The operations include receiving, by the UE via higher layer signaling, a channel state information (CSI) report configuration list including at least one CSI report configuration, receiving, by the UE, a medium access control (MAC) control element (CE) including first information for activation/deactivation respectively of a plurality of configurations included in a CSI report configuration corresponding to the first information among the at least one CSI report configuration, and transmitting, by the UE on a physical uplink control channel (PUCCH), a CSI report including a CSI parameter based on a configuration activated by the first information.

The disclosure proposes a series of methods for flexibly providing associated information (such as power information, spatial domain information, and frequency-domain information) of network devices. By these methods, UEs can immediately change corresponding parameters, thereby improving the performance (CSI feedback accuracy) of the UEs.

The effects that can be achieved through the disclosure are not limited to the effects mentioned in the various embodiments, and other effects not mentioned will be clearly understood by those skilled in the art from the description below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
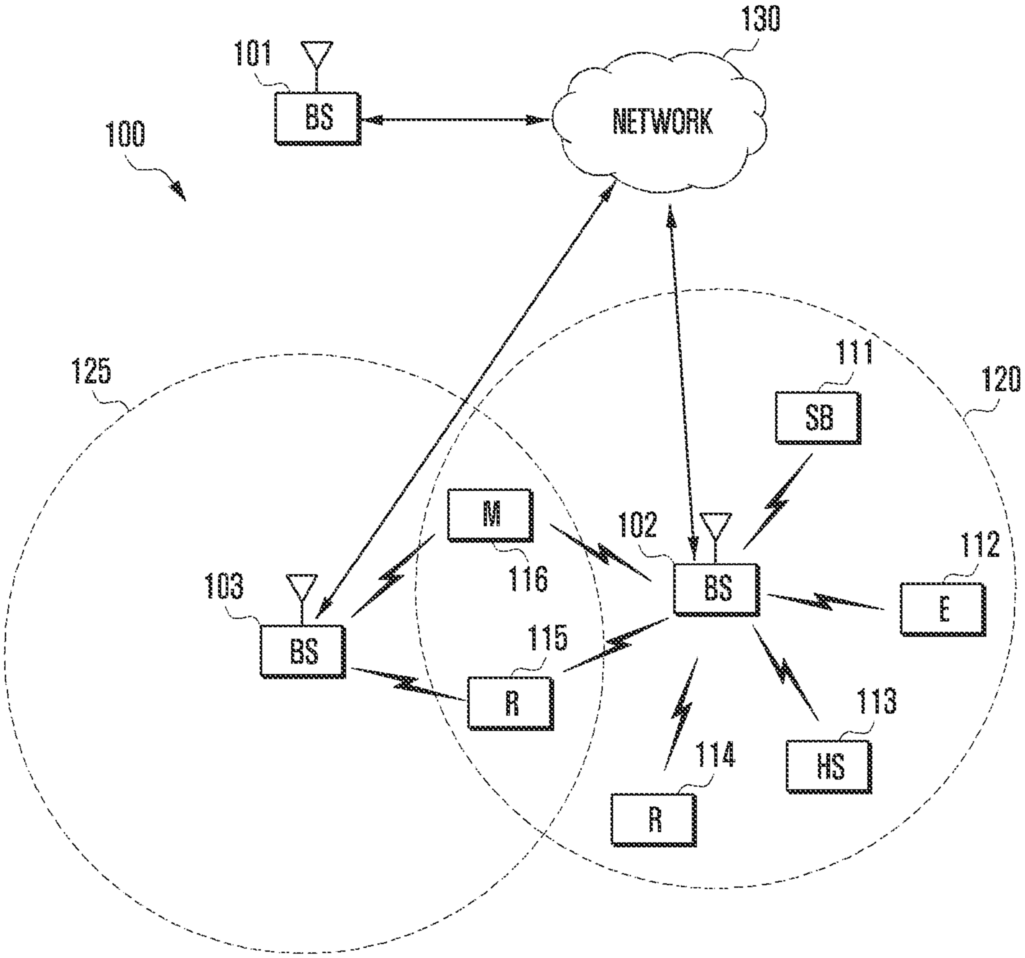
FIG. 1 illustrates an overall structure of an example wireless communication network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be enlarged, omitted, or schematically illustrated. Moreover, the size of each element does not completely reflect an actual size. In the accompanying drawings, same or corresponding elements have same reference numerals.

The advantages and features of the disclosure and modes for carrying out them will become clear with reference to the embodiments described below in detail in conjunction with the accompanying drawings. However, the disclosure is not limited to the embodiments set forth below and may be implemented in various different forms. The following embodiments are provided merely for the purpose of completely disclosing the disclosure and informing those skilled in the art about the scope of the disclosure, and the scope of the disclosure is merely defined by the appended claims. In the whole specification, same or similar reference numerals denote same or similar elements.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 illustrates an example wireless communication network 100 according to an embodiment of the disclosure. The embodiment of the wireless communication network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station (BS)" or "access point (AP)" can be used instead of "gNodeB" or "gNB". For convenience, the terms "gNodeB" and "gNB" are used in this patent document to refer to network infrastructure components that provide wireless access for remote terminals. Moreover, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipment (UEs) within a coverage area 120 of gNB 102. The first plurality of UEs include a UE 111, which may be located in a Small Business (SB); a UE 112, which may be located in an enterprise (E); a UE 113, which may be located in a Wi-Fi Hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistant (PDA), etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-advanced (LTE-A), WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
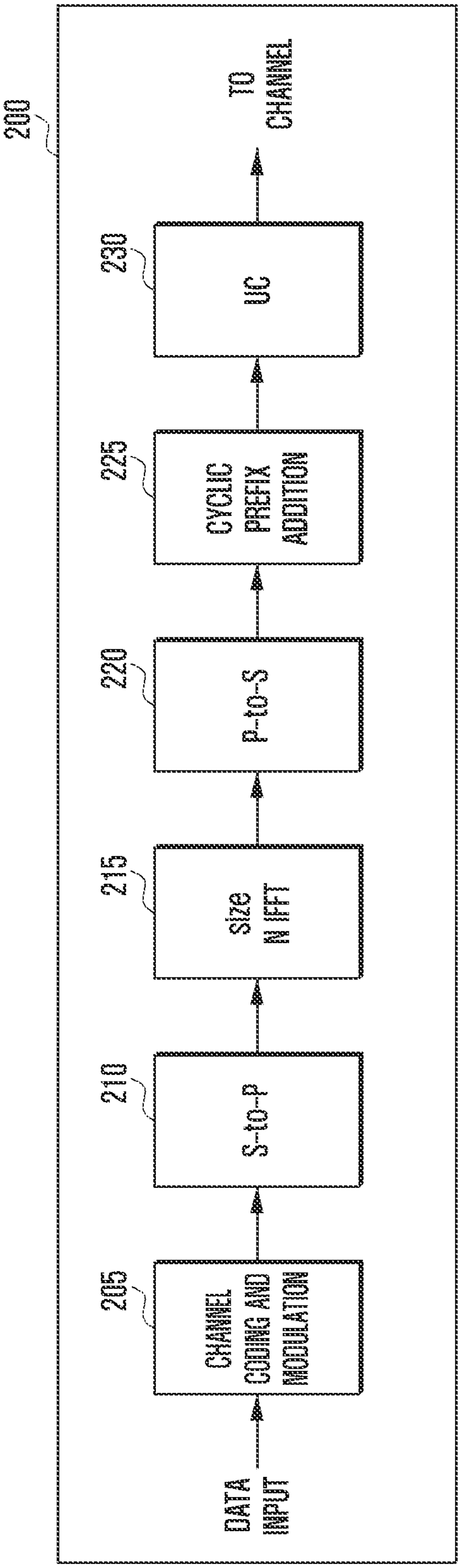
FIG. 2A illustrates a transmission path 200 in a wireless communication network according to various embodiments of the disclosure.
Figure 2B:
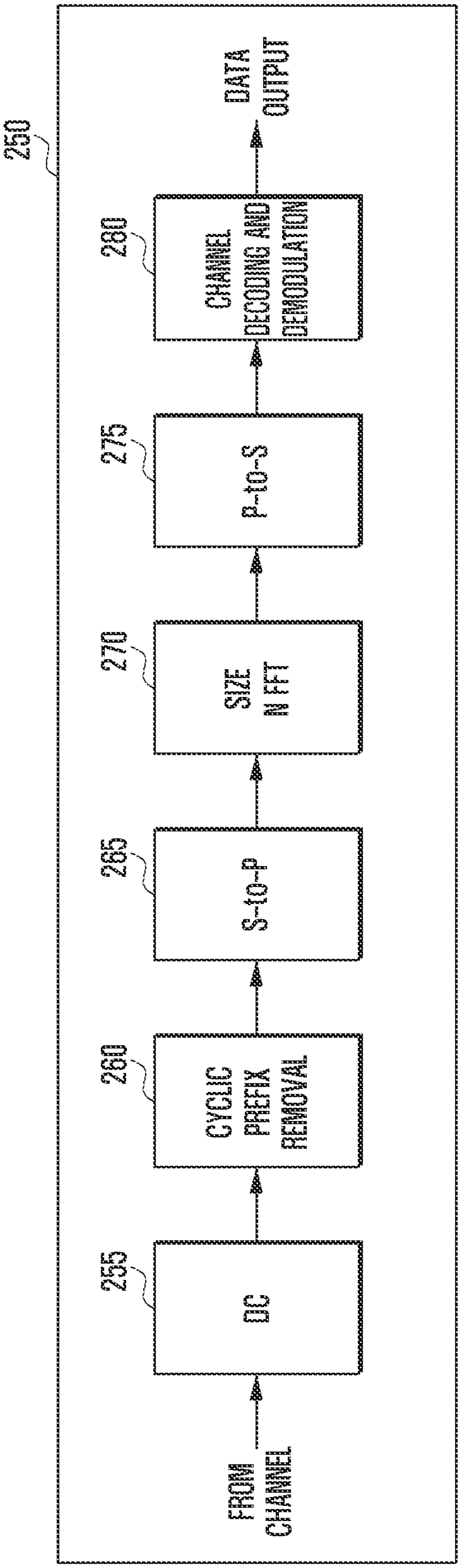
FIG. 2B illustrates a reception path 250 in a wireless communication network according to various embodiments of the disclosure.

FIGS. 2A and 2B illustrate a transmission path 200 and a reception path 250 in a wireless communication network according to various embodiments of the disclosure, respectively.

In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to a radio frequency (RF) frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
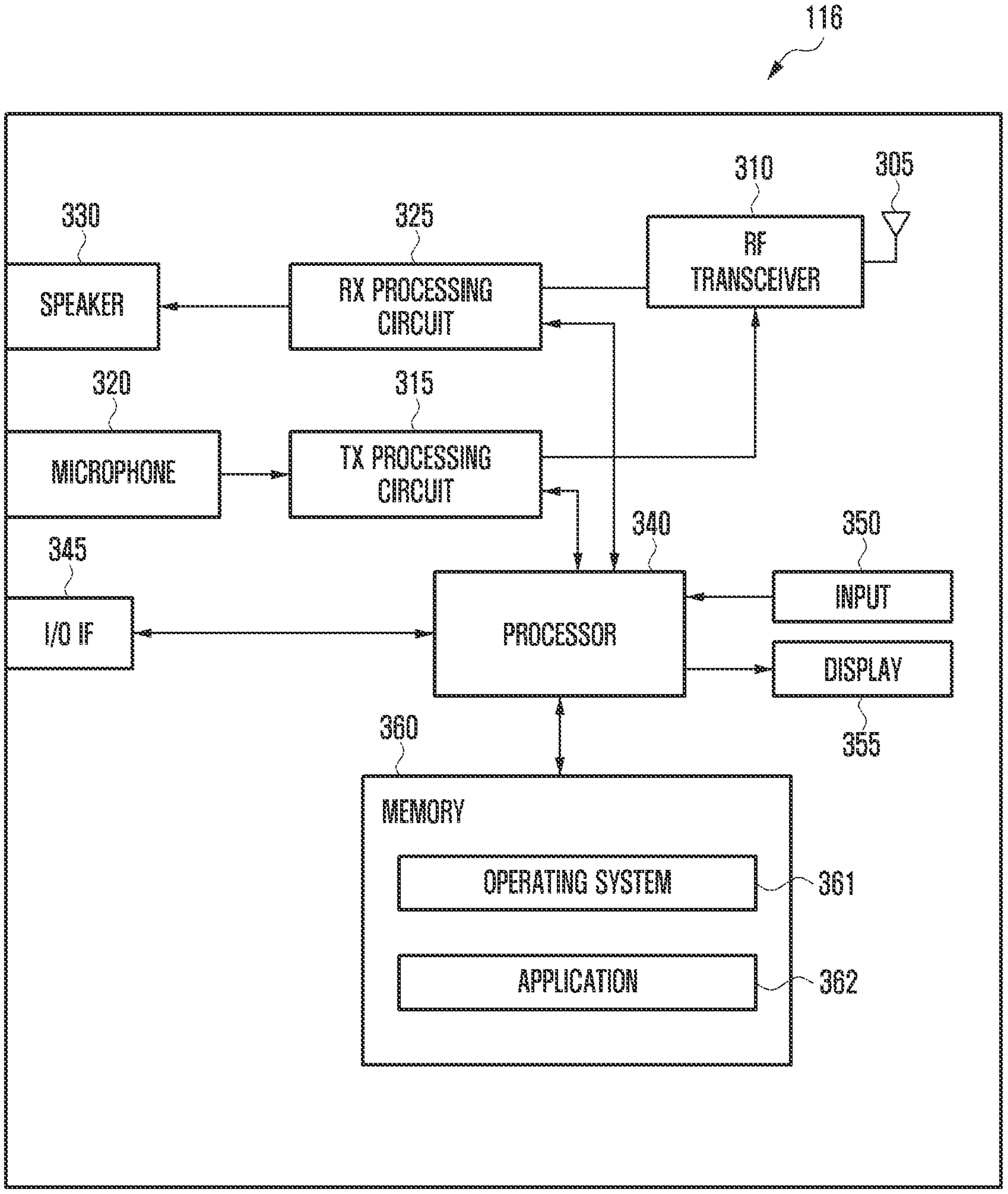
FIG. 3A illustrates a structure of a user equipment (UE) in a wireless communication network according to various embodiments of the disclosure.

FIG. 3A illustrates an example UE 116 according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
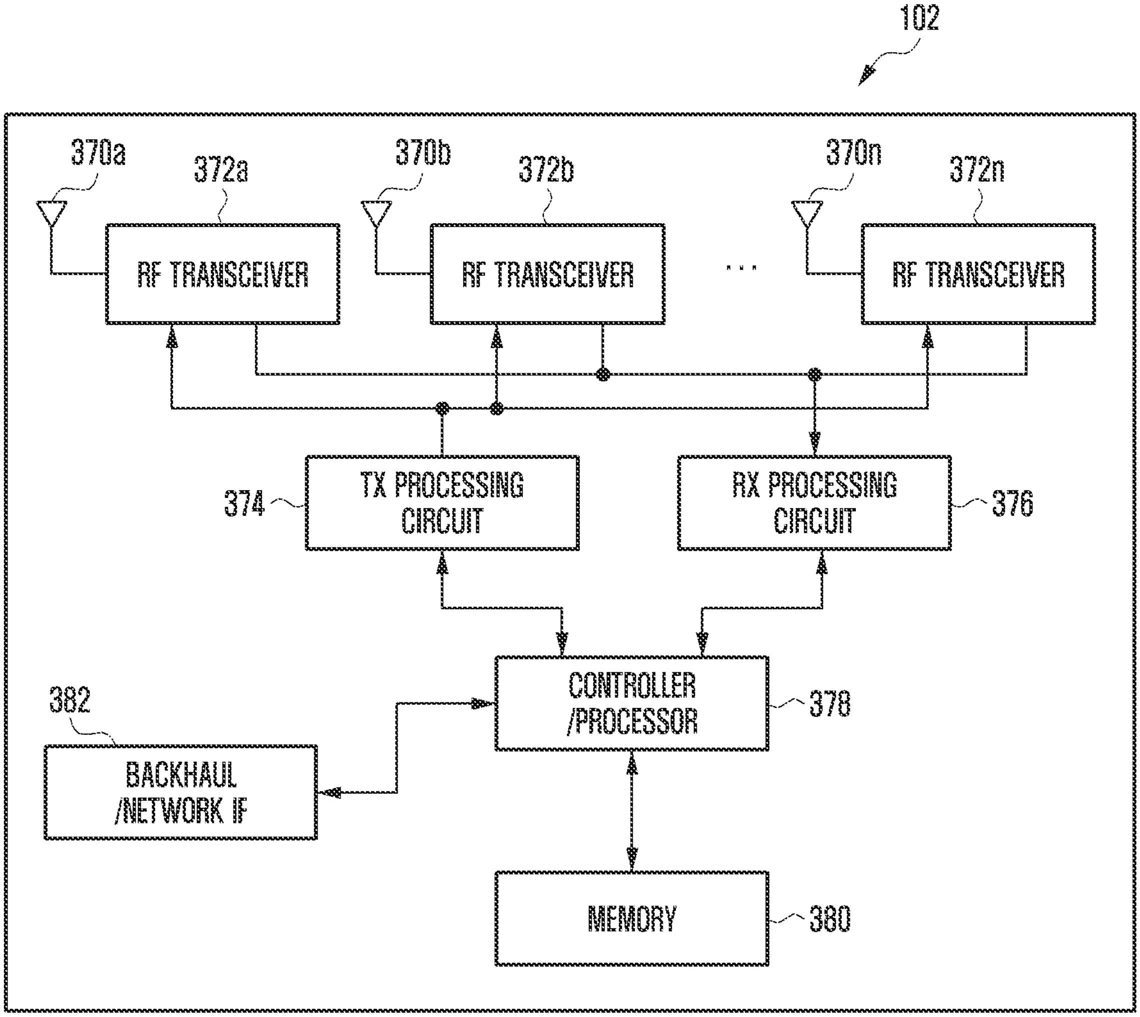
FIG. 3B illustrates a structure of a base station in a wireless communication network according to various embodiments of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3B. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

At present, in a wireless communication system, a user equipment (UE) can obtain power parameter(s) and/or spatial domain parameter(s) change on a network device side only in a semi-static manner. This cannot meet the requirement of flexible adjustment on a base station side.

The embodiments of the disclosure will be described below in detail with reference to the accompanying drawings.

Embodiment I

Figure 4A:
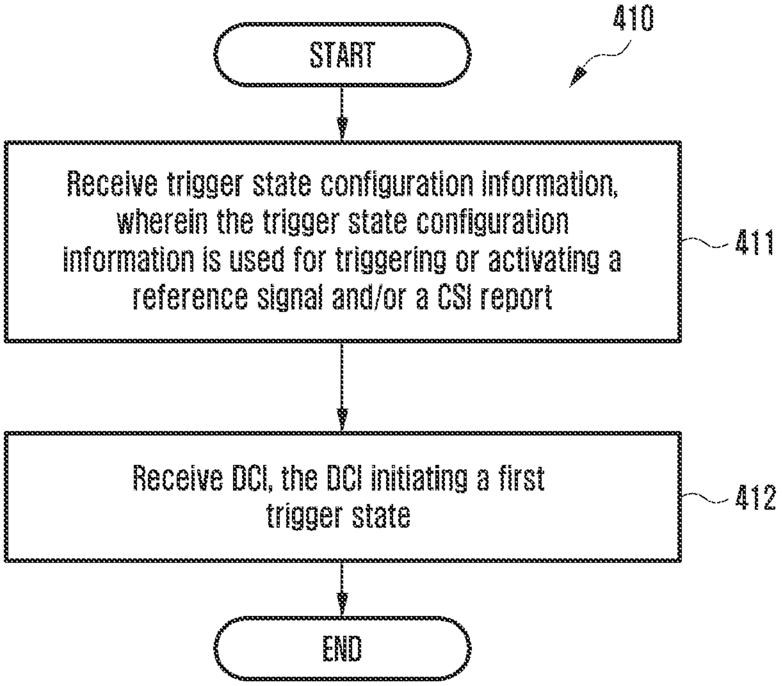
FIG. 4A illustrates a method performed by a UE according to various embodiments of the disclosure.

FIG. 4A illustrates a method 410 performed by a user equipment (UE) according to an embodiment of the disclosure. Optionally, first information is determined. Optionally, based on a first parameter associated with a CSI report, a CSI parameter is determined or at least one first CSI report is reported. Optionally, the first parameter is based on the first information.

The method 410 includes that: optionally, the UE receives trigger state configuration information at 411. Optionally, the trigger state configuration information is used for triggering and activating a reference signal and/or a channel state information (CSI) report. Optionally, the trigger state configuration information is used for configuring a trigger state list (e.g., a semi-persistent trigger state list and an aperiodic trigger state list) for the UE. Optionally, the trigger state configuration information is used for configuring a list of trigger states for semi-persistent reporting of CSI on a physical layer (e.g., layer 1, L1). Optionally, the trigger state configuration information is CSI-SemiPersistentOnPUSCH-TriggerStateList. For example, the trigger state configuration information is used for configuring an aperiodic trigger state list for the UE, such as CSI-AperiodicTriggerStateList.

Optionally, the trigger state configuration information is associated with/includes/is configured with one or more trigger states (e.g., a trigger state parameter or a CSI trigger state). Here, a number of trigger states associated with/included in/configured by the trigger state configuration information may be n. Optionally, each (or at least one) of the one or more trigger states may be associated with one or more CSI reports (e.g., CSI report configuration information or a CSI report configuration parameter).

Optionally, the UE receives downlink control information (DCI) (e.g., a DCI format) at 412. Optionally, the DCI initiates a first trigger state. Here, the first trigger state is associated with one or more trigger states associated with/included in the trigger state configuration information. For example, such association may be (be understood as) that the first trigger state is one of the one or more trigger states. The DCI initiates the first trigger state by at least one of the following methods.

Method I

The DCI includes a CSI request field. Each codepoint of the DCI field "CSI request" is associated with one trigger state. For example, when a value of the CSI request field is 0 (i.e., all bits of the CSI request field are 0), no CSI is requested. When the number (n) of the trigger states associated with/included in/configured by the trigger state configuration information is greater than $2^{N\_TS}-1$, the UE receives a subselection indication to map at most $2^{N\_TS}-1$ trigger states to the codepoints of the CSI request field (e.g., to at most $2^{N\_TS}-1$ codepoints other than the codepoint having the value of 0). When the number (n) of the trigger states associated with/included in/configured by the trigger state configuration information is less than or equal to $2^{N\_TS}-1$, the CSI request field directly indicates the trigger states. Here, N_TS refers to a number of bits of the CSI request field. Optionally, N_TS is configured by a higher-level parameter (e.g., reportTriggerSize). Optionally, a value range of N_TS is {0, 1, 2, . . . , X}. X is a positive integer greater than 6. For example, X is at least one of 7, 8, 9, 10, 11, and 12. The advantage of the value of X being greater than 6 is that when the DCI indicates and updates other more parameters while triggering a CSI report, more different parameter combinations (or trigger states) are needed for selection by the DCI so that the flexibility of system indication can be improved.

Optionally, a mapping method for the codepoints (e.g., non-zero codepoints) of one CSI request field with the trigger states is based on a relative position of the (at most $2^{N\_TS}-1$) trigger states in the trigger state configuration information. For example, codepoint '1' is associated with a first trigger state. For example, codepoint '2' is associated with a second trigger state, and so on.

Optionally, when the UE is initiated a first trigger state (or, when the UE receives a value for triggering the first trigger state), the UE performs (or will perform) reference signal (e.g., at least one of channel state information-reference signal (CSI-RS), channel state information-interference measurement (CSI-IM), and synchronization signal block (SSB)) measurement and/or CSI reporting (semi-persistent or aperiodic CSI reporting) based on the first trigger state (or, based on information associated with the first trigger state).

Method II

The DCI includes a CSI request field. Optionally, a cyclical redundancy check (CRC) bit of the DCI (or the DCI format) is scrambled by a semi-persistent-channel state information-radio network temporary identity (SP-CSI-RNTI). Here, a number of bits of the CSI request field is denoted as N_TS. Optionally, N_TS is configured by a higher-level parameter (e.g., reportTriggerSize). Optionally, a value range of N_TS is {0, 1, 2, . . . , X}. X is a positive integer greater than 6. For example, X is at least one of 7, 8, 9, 10, 11, and 12. The advantage of the value of X being greater than 6 is that when the DCI indicates and updates other more parameters while triggering a CSI report, more different parameter combinations (or trigger states) are needed for selection by the DCI so that the flexibility of system indication can be improved.

Optionally, a mapping method for the codepoints of one CSI request field with the trigger states is based on a relative position of the trigger states in the trigger state configuration information. For example, codepoint '0' is associated with a first trigger state. For example, codepoint '1' is associated with a second trigger state, and so on.

Optionally, when the UE is initiated a first trigger state (or, when the UE receives a value for triggering the first trigger state), the UE performs (or will perform) reference signal (e.g., at least one of CSI-RS, CSI-IM, and SSB) measurement and/or CSI reporting (semi-persistent or aperiodic CSI reporting) based on the first trigger state (or, based on information associated with the first trigger state).

Optionally, a first parameter associated with a CSI report in association with the first trigger state (e.g., a parameter for CSI reporting or a parameter for CSI parameter determination/calculation) is indicated or updated by first information associated with/included in the first trigger state (in other words, the first information may be information for indicating or updating the first parameter). Optionally, the first information may be received through higher-level signaling (e.g., radio resource control (RRC) signaling or MAC-CE signaling) or the DCI. The trigger state configuration information is associated with/includes one or more trigger states (e.g., a trigger state parameter). Optionally, each (or at least one) of the one or more trigger states may be associated with/include associated information report (e.g., associatedReportConfigInfoList). Optionally, the report associated information of (one) report includes at least one of: CSI report information (e.g., reportConfigId) and reference signal resource information (associated with the CSI report information). Optionally, the reference signal resource information includes reference resource information (e.g., resourcesForChannel) for channel measurement and/or reference resource information for interference measurement. Optionally, the reference resource information for interference measurement includes CSI-IM related reference resource information for interference measurement (csi-IM-ResourcesForInterference) and/or non-zero power (NZP) CSI-RS related reference resource information for interference measurement (nzp-CSI-RS-ResourcesForInterference). Optionally, the reference signal resource information (associated with the CSI report information) is used for indicating/selecting an index/information of (for) a reference signal resource set (associated with the CSI report information). For example, the CSI report corresponding to the CSI report information (e.g., CSI report configuration information) is associated with one or more reference signal resource sets, and the index/information is used for indicating/selecting at least one of the set(s).

Optionally, the first information is determined and/or the first parameter is indicated or updated by the first information by at least one of the following methods.

Method I

The report associated information (further) includes/is associated with first information. The first information may be used to indicate/update/override a first parameter of (one or more) CSI report(s) associated with the report associated information. Optionally, the first information is associated with/includes/is configured with one or more first configuration information (e.g., power configuration information and/or spatial domain configuration information, etc.). Optionally, the first information indicates/selects at least one from the one or more first configuration information. Optionally, the first information includes one or more first index information. Optionally, the index information may indicate/select at least one from the one or more first configuration information. One/each of index information corresponds to/is associated with one or more first configuration information (in a reference cell group/reference cell or a reference bandwidth part (BWP) or for a reference CSI report or for a reference signal resource or for a reference signal resource set). The one or more first configuration information may be configured per cell/component carrier (CC)/cell group/CC group/BWP/reference signal resource/reference signal resource set/CSI report. For example, the one or more first configuration information may be configured in cell group configuration information (CellGroupConfig). For example, the one or more first configuration information may be configured in serving cell configuration information (ServingCellConfig). For example, the one or more first configuration information may be configured in downlink BWP dedicated configuration information (BWP-DownlinkDedicated). For example, the one or more first configuration information may be configured in non-zero power CSI reference signal resource set configuration information (NZP-CSI-RS-ResourceSet). For example, the one or more first configuration information may be configured in CSI resource configuration information (CSI-ResourceConfig). For example, the one or more first configuration information may be configured in non-zero power CSI reference signal resource configuration information (NZP-CSI-RS-Resource). For example, the one or more first configuration information may be configured in CSI report configuration information (associated with the first trigger state) (CSI-ReportConfig). Optionally, at least one of the reference cell group, the reference cell, the reference BWP, the reference signal resource, the reference signal resource set, and the CSI report may be configured by higher-level signaling or may be predefined. For example, the predefined reference cell group may be a main cell group (MCG). For example, the reference cell may be a primary cell (PCell). For example, the predefined reference BWP may be a BWP with the smallest ID. For example, the predefined reference signal resource may be a reference signal resource with the smallest ID. For example, the predefined reference signal resource set may be a reference signal resource set with the smallest ID. For example, the predefined CSI report may be a CSI report with the smallest CSI report configuration ID. The advantage of such a configuration method is that the first parameter typically has a correlation (e.g., spatial domain parameters in different cells have a correlation). Such a configuration/indication method for the first parameter (or the first information) may reduce a higher-level signaling overhead. Optionally, the reference signal resource (or reference signal resource set) may be a reference signal resource for CSI reporting associated with the report associated information.

Optionally, the report associated information (further) is associated with/includes/is configured with (one or more) CSI report(s) (information). The first information indicates/updates/override the first parameter used by the CSI report. Optionally, the first information indicates the first parameter used by the reference signal resource (set) (for measurement) associated with the CSI report. Optionally, the first information indicates the first parameter used by one or more reference signal resources (for measurement) associated with the CSI report. Optionally, the report associated information includes the first information. Optionally, one or more first configuration information included in the first information indicate the first parameter used by one or more reference signals (for measurement) associated with the CSI report. Optionally, one or more first configuration information are in one-to-one correspondence/one-to-one association with the one or more reference signals. Optionally, the first information includes one or more index information, wherein the index information indicates the first parameter used by one or more reference signals (for measurement) associated with the CSI report. Optionally, the index information may indicate/select at least one of the one or more first configuration information. Optionally, one or more index information are in one-to-one correspondence/one-to-one association with the one or more reference signals. Optionally, the reference signal resource is a reference signal resource for channel measurement and/or a reference signal resource (set) for interference measurement. Here, one or more first configuration information may be configured per cell/component carrier (CC)/cell group/CC group/BWP/reference signal resource/reference signal resource set/CSI report. The configuration method is as shown in the above description. In addition, the description of the index information is as described above.

Optionally, the reference signal resource associated with the CSI report configuration information is configured with the first parameter. The first parameter may be updated/overridden by the first information associated with the report associated information.

Method II

Reference signal resource (set) information (e.g., reference signal resource (set) information associated with CSI report information) is associated with/includes first information. The first information includes a first parameter for indicating/updating/overriding a reference signal resource (indicated by the reference signal resource information) (or a reference signal resource in a reference signal resource set) or a reference signal resource. Optionally, the first information is associated with/includes/is configured with one or more first configuration information (for example, power configuration information; for another example, spatial domain configuration information). Optionally, the first information includes one or more first index information. Optionally, the index information may indicate/select at least one from the one or more first configuration information. One/each of index information corresponds to/is associated with one or more first configuration information (in a reference cell group/reference cell or a reference BWP or for a reference CSI report or for a reference signal resource or for a reference signal resource set). The one or more first configuration information is configured per cell/CC/cell group/CC group/reference signal resource/reference signal resource set/CSI report. For example, the one or more first configuration information may be configured in cell group configuration information (CellGroupConfig). For example, the one or more first configuration information may be configured in serving cell configuration information (ServingCellConfig). For example, the one or more first configuration information may be configured in downlink BWP dedicated configuration information (BWP-DownlinkDedicated). For example, the one or more first configuration information may be configured in non-zero power CSI reference signal resource set configuration information (NZP-CSI-RS-ResourceSet). For example, the one or more first configuration information may be configured in CSI resource configuration information (CSI-ResourceConfig). For example, the one or more first configuration information may be configured in non-zero power CSI reference signal resource configuration information (NZP-CSI-RS-Resource). For example, the one or more first configuration information may be configured in CSI report configuration information (CSI-ReportConfig). Optionally, at least one of the reference cell group, the reference cell, the reference BWP, the reference signal resource, the reference signal resource set, and the CSI report may be configured by higher-level signaling or may be predefined. For example, the predefined reference cell group may be a main cell group (MCG). For example, the reference cell may be a primary cell (PCell). For example, the predefined reference BWP may be a BWP with the smallest ID. For example, the predefined reference signal resource may be a reference signal resource with the smallest ID. For example, the predefined reference signal resource set may be a reference signal resource set with the smallest ID. For example, the predefined CSI report may be a CSI report with the smallest CSI report configuration ID. The advantage of such a configuration method is that the first parameter typically has a correlation (e.g., spatial domain parameters in different cells have a correlation). Such a configuration method for the first parameter may reduce a higher-level signaling overhead. Optionally, the reference signal resource (or reference signal resource set) may be a reference signal resource for CSI reporting associated with the report associated information.

Optionally, the reference signal resource information (further) is associated with/includes/is configured with (one or more) CSI report(s) (e.g., CSI report configuration information). The first information indicates/updates/overrides the first parameter used by the CSI report (a reference signal resource in the reference signal resource set indicated by the reference signal resource information). Optionally, the first information indicates the first parameter used by the reference signal resource (set) (for measurement) associated with the CSI report. Optionally, the first information indicates the first parameter used by one or more reference signals (for measurement) associated with the CSI report. Optionally, the report associated information includes the first information. Optionally, one or more first configuration information included in the first information indicate the first parameter used by one or more reference signals (for measurement) associated with the CSI report. Optionally, one or more first configuration information are in one-to-one correspondence/one-to-one association with the one or more reference signals. Optionally, the first information includes one or more index information, wherein the index information indicates the first parameter used by one or more reference signals (for measurement) associated with the CSI report. Optionally, the index information may indicate/select at least one from the one or more first configuration information. Optionally, one or more index information are in one-to-one correspondence/one-to-one association with the one or more reference signals. Optionally, the reference signal resource is a reference signal resource for channel measurement and/or a reference signal resource for interference measurement. Here, one or more first configuration information may be configured per cell/component carrier (CC)/cell group/CC group/BWP/reference signal resource/reference signal resource set/CSI report. The configuration method is as shown in the above description. In addition, the description of the index information is as described above.

Optionally, (the reference signal resource in) the reference signal resource set indicated by the reference signal resource information is configured with the first parameter. The first parameter may be updated/overridden by the first information.

The first information is described below. The first information includes at least one of power information, spatial domain information, frequency-domain information, channel quality indicator (CQI) table information, L1-RSRP table information, L1-SINR table information, measurement information, and CSI report container information.

The first information includes/is associated with the power information. Optionally, the first parameter indicated or updated by the first information includes a power parameter for the power information to indicate or update a reference signal resource or a power parameter of a CSI report. Optionally, the first parameter (e.g., power parameter) associated with a CSI report in association with a first trigger state is indicated or updated by the DCI or the first information (e.g., power information) associated with the first trigger state. Optionally, the power information includes/is associated with relative power information/power parameter. Optionally, the power information includes/is associated with absolute power information/power parameter. The first information (power parameter/power information) includes/is associated with one or more first configuration information (e.g., a power offset parameter). For example, the power offset parameter is a power offset parameter (e.g., powerControlOffset) for a physical downlink shared channel (PDSCH) resource element (RE) and a non-zero power (NZP) channel state information reference signal resource element (CSI-RS RE). For example, the power offset parameter is a power offset parameter (e.g., powerControlOffsetSS) for a non-zero power (NZP) channel state information reference signal resource element (CSI-RS RE) and a secondary synchronization signal resource element (SSS RE). Optionally, the first information (e.g., power parameter/power information) includes/is associated with one or more first configuration information (e.g., a power offset adjustment parameter). Optionally, the power offset adjustment parameter is related to a change/increment/adjustment of a power offset. Optionally, the UE determines a CSI parameter (associated with a CSI report) according to the power parameter and/or the power offset adjustment parameter. For example, the UE determines the CSI parameter according to a sum of the power parameter (e.g., powerControlOffset) and the power offset adjustment parameter. Optionally, determining the CSI parameter may be determining a CSI feedback. determining the CSI parameter may also be determining a report carrying the CSI parameter (i.e., determining a CSI report). Optionally, the CSI parameter may be a CSI feedback. The CSI parameter may also be a report carrying the CSI parameter (i.e., a CSI report).

The advantage of this method is that a base station may adjust/indicate the power parameter/assumption (for CSI calculation) of a reference signal associated with a CSI report while triggering the CSI report, thereby improving the system flexibility.

The first information includes/is associated with the spatial domain information. Optionally, the first parameter indicated or updated by the first information includes a spatial domain parameter for the spatial domain information to indicate or update for a reference signal resource or a spatial domain parameter for a CSI report. Optionally, the first parameter (e.g., spatial domain parameter) associated with a CSI report in association with the first trigger state is indicated or updated by the DCI or the first information (e.g., spatial domain information) associated with the first trigger state. Optionally, the spatial domain information includes/is associated with one or more codebook configuration parameters (e.g., a parameter for configuring type I and type II codebooks, CodebookConfig). Here, the first configuration information may include the codebook configuration parameter.

Optionally, the spatial domain information includes/is associated with one codebook configuration parameter (e.g., the parameter for configuring type I and type II codebooks, CodebookConfig) or one or more second spatial domain parameters. Here, one or more first configuration information may include one codebook configuration parameter and one or more second spatial domain parameters. For example, the spatial domain information indicates one of one codebook configuration parameter and one or more second spatial domain parameters. The first parameter is determined based on the indicated codebook configuration parameter and one or more second spatial domain parameters. The codebook configuration parameter at least is associated with/includes at least one of: a first-dimension number (N1) and a corresponding oversampling parameter (O1); a second-dimension number (N2) and a corresponding oversampling parameter (O2); a codebook restriction; a codebook type; a codebook mode; a frequency-domain feature; and a rank indicator (RI) restriction. Optionally, the codebook type includes a type I codebook and a type II codebook. Optionally, the type I codebook may include a (subtype) type I single-panel codebook and a type I multi-panel codebook. Optionally, the type II codebook may include a (subtype) type II codebook and a type II port selection codebook. Optionally, the codebook mode includes a mode I and a mode II. Optionally, the frequency-domain feature includes a frequency-domain granularity (parameter) and/or subband (parameter). Optionally, the codebook restriction may be a bitmap parameter. The second spatial domain parameter is associated with/includes at least one of: a first-dimension number (N1) and/or a corresponding oversampling parameter (O1); a second-dimension number (N2) and/or a corresponding oversampling parameter (O2); and a codebook subset restriction. Optionally, the first-dimension number associated with a codebook parameter is greater than or equal to a first-dimension parameter associated with (all) second spatial domain parameters. Optionally, the second-dimension number associated with a codebook parameter is greater than or equal to a second-dimension parameter associated with (all) second spatial domain parameters. Optionally, the first-dimension number associated with a codebook parameter is less than or equal to the first-dimension parameter associated with (all) second spatial domain parameters. Optionally, the second-dimension number associated with a codebook parameter is less than or equal to the second-dimension parameter associated with (all) second spatial domain parameters. Optionally, the first parameter (e.g., spatial domain parameter) is determined based on the codebook parameter and one or more second spatial domain parameters. Methods are as follows.

Method I

An oversampling parameter associated with the spatial domain parameter is determined based on the codebook parameter and the second spatial domain parameter. Optionally, the second spatial domain parameter includes a first dimension and/or second-dimension number. Optionally, an oversampling parameter of a first dimension associated with the spatial domain parameter is determined based on a product of the oversampling parameter of the first dimension associated with the codebook parameter and the oversampling parameter of the first dimension, and the first-dimension number in the second spatial domain parameter. Optionally, an oversampling parameter of a second dimension associated with the spatial domain parameter is determined based on a product of the oversampling parameter of the second dimension associated with the codebook parameter and the oversampling parameter of the second dimension, and the second-dimension number in the second spatial domain parameter. Optionally, the first-dimension number associated with the spatial domain parameter is equal to a product of the corresponding oversampling parameters. Optionally, the second-dimension number associated with the spatial domain parameter is equal to a product of the corresponding oversampling parameters.

Method II

Optionally, a codebook type associated with the spatial domain parameter is determined based on the codebook parameter. For example, the codebook type associated with/corresponding to the spatial domain parameter is the same as the codebook type associated with/corresponding to the codebook parameter.

Method III

A codebook mode associated with the spatial domain parameter is determined based on the codebook parameter. For example, the codebook mode associated with/corresponding to the spatial domain parameter is the same as the codebook mode associated with/corresponding to the codebook parameter.

Method IV

A frequency-domain granularity associated with the spatial domain parameter is determined based on the codebook parameter. For example, the frequency-domain granularity associated with/corresponding to the spatial domain parameter is the same as the frequency-domain granularity associated with/corresponding to the codebook parameter.

Method V

An RI restriction associated with the spatial domain parameter is determined based on the codebook parameter. For example, the RI restriction associated with/corresponding to the spatial domain parameter is the same as the RI restriction associated with/corresponding to the codebook parameter.

Method VI

A codebook restriction associated with the spatial domain parameter is determined based on the codebook parameter and/or the second spatial domain parameter. For example, the codebook restriction of the spatial domain parameter is determined by the following methods.

Method I

The codebook restriction associated with/included in the spatial domain parameter is the same as a codebook restriction associated with the codebook parameter. For example, when the codebook parameter is the same as the first-dimension number (N1) associated with/included in the second spatial domain parameter and a plurality of codebook parameters are also each the same as the second-dimension number (N2) associated with/included in the second spatial domain parameter, values of a bitmap associated with the spatial domain parameter (for indicating the codebook restriction) are the same as values of bitmaps associated with the codebook parameters (for indicating the codebook restriction). For example, the bits of these bitmaps are in one-to-one correspondence with one another and have same values.

Method II

The codebook restriction associated with/included in the spatial domain parameter is determined according to a codebook restriction associated with the codebook parameter and the second spatial domain parameter. For example, when the codebook parameter is in a multiple relationship (e.g., 2-fold; e.g., a power of 2) with the first-dimension number (N1) associated with/included in the second spatial domain parameter and the codebook parameter is in a multiple relationship (e.g., 2-fold; e.g., a power of 2) with the second-dimension number (N2) associated with/included in the second spatial domain parameter, the codebook restriction associated with/included in the codebook parameter may be a bitmap parameter. Optionally, the codebook restriction associated with the codebook parameter is $a_{N_2O^2l+m}$. $a_{N_2O^2l+m}$ is associated with all precoders based on the quantity $v_{l,m}$, $l=0, \ldots, N_1O_1-1$, $m=0, \ldots, N_2O_2-1$. The definition of $v_{l,m}$ is as shown in the following Equation 1. The definition of $\tilde{v}_{l,m}$ is as shown in the following Equation 1. Optionally, the codebook restriction associated with the spatial domain parameter or the second spatial domain parameter is based on $v'_{l',m'}$, $l'=0, \ldots, N'_1O'_1-1$, $m'=0, \ldots, N'_2O'_2-1$. The definition of $v'_{l',m'}$ is the same as the definition of $v_{l,m}$ except that: $N_1$ is replaced with $N'_1$; $N_2$ is replaced with $N'_2$; $O_1$ is replaced with $O'_1$; and $O_2$ is replaced with $O'_2$. The definition of $\tilde{v}'_{l',m'}$ is the same as the definition of $\tilde{v}_{l,m}$ except that: $N_1$ is replaced with $N'_1$; $N_2$ is replaced with $N'_2$; $O_1$ is replaced with $O'_1$; and $O_2$ is replaced with $O'_2$. Optionally, $N_1$ is greater than or equal to $N'_1$, and a ratio of $N_1$ to $N'_1$ is $\hat{p}$; $N'_2$ is greater than or equal to $N_2$, and a ratio of $N_2$ to $N'_2$ is $\hat{q}$. Optionally, $O_1=O'_1$; $O_2=O'_2$. Optionally, $\hat{p}$ is a power of 2. For example, $\hat{p}$ is at least one of 1, 2, 4, and 8. Optionally, $\hat{q}$ is a power of 2. For example, q is at least one of 1, 2, 4, and 8.

Optionally, whether PMI reporting is allowed is based on correlation of $v'_{l,m}$ and $a_{N_2O_2l+m}$. For example, when at least one of the following conditions is met, $v'_{l',m'}$ is associated with a bit of $a_{N_2O_2l+m}$ corresponding to $v_{l,m}$:

$$\hat{p}l' + k_3 = l;$$

$$\hat{q}m' + k_4 = m;$$

$$(\hat{p}l' + k_3) \bmod N_1 O_1 = l;$$

$$(\hat{q}m' + k_4) \bmod N_2 O_2 = m;$$

$$[N_2' O_2' (\hat{p}l' + k_3) + (\hat{q}m' + k_4)] \bmod N_1 O_1 N_2 O_2 = N_2 O_2 l + m.$$

When $v'_{l',m'}$ is associated with at least one bit and at least one of them is zero, PMI reporting is not allowed to correspond to any precoder based on $v'_{l',m'}$. Optionally, $k_3$ is predefined. For example, $k_3=0$. For example, $k_3=0, 1$. For example, $k_3=0, 1, 2$. Optionally, $k_3$ is based on $\hat{p}$. For example, $k_3=0, 1, \ldots, \hat{p}/2$. For example, $k_3=0, 1, \ldots, \hat{p}/2$ rounded up to an integer. For example, $k_3=0, 1, \ldots, \hat{p}/2$ rounded down to an integer. Optionally, $k_4$ is predefined. For example, $k_4=0$. For example, $k_4=0, 1$. For example, $k_4=0, 1, 2$. Optionally, $k_4$ is based on $\hat{q}$. For example, $k_4=0, 1, \ldots, \hat{q}/2$. For example, $k_4=0, 1, \ldots, \hat{q}/2$ rounded up to an integer. For example, $k_4=0, 1, \ldots, \hat{q}/2$ rounded down to an integer.

Optionally, whether PMI reporting is allowed is based on correlation of $\tilde{v}'_{l',m'}$ and $a_{N_2O_2l+m}$. For example, when at least one of the following conditions is met, $\tilde{v}'_{l',m'}$ is associated with a bit of $a_{N_2O_2l+m}$ corresponding to $v_{l,m}$:

$$2\hat{p}l' + k_5 = l;$$

$$\hat{q}m' + k_4 = m;$$

$$(2\hat{p}l' + k_5) \bmod N_1 O_1 = l;$$

$$(\hat{q}m' + k_4) \bmod N_2 O_2 = m;$$

$$[N_2' O_2' (2\hat{p}l' + k_5) + (\hat{q}m' + k_4)] \bmod N_1 O_1 N_2 O_2 = N_2 O_2 l + m.$$

When $v'_{l',m'}$ is associated with at least one bit and at least one of them is zero, PMI reporting is not allowed to correspond to any precoder based on $v'_{l',m'}$. Optionally, $k_5$ is predefined. For example, $k_5=0$. For example, $k_5=0, 1$. For example, $k_5=0, 1, 2$. Optionally, $k_5$ is based on $\hat{p}$. For example, $k_5=0, 1, \ldots, \hat{p}$. Optionally, $k_4$ is predefined. For example, $k_4=0$. For example, $k_4=0, 1$. For example, $k_4=0, 1, 2$. Optionally, $k_4$ is based on $\hat{q}$. For example, $k_4=0, 1, \ldots, \hat{q}/2$. For example, $k_4=0, 1, \ldots, \hat{q}/2$ rounded up to an integer. For example, $k_4=0, 1, \ldots, \hat{q}/2$ rounded down to an integer.

Equation 1

$$u_m = \begin{cases} \begin{bmatrix} 1 & e^{j\frac{2\pi m}{O_2N_2}} & \ldots & e^{j\frac{2\pi m(N_2-1)}{O_2N_2}} \end{bmatrix} & N_2 > 1 \\ 1 & N_2 = 1 \end{cases}$$

$$v_{l,m} = \begin{bmatrix} u_m & e^{j\frac{2\pi l}{O_1N_1}} u_m & \ldots & e^{j\frac{2\pi l(N_1-1)}{O_1N_1}} u_m \end{bmatrix}^T$$

$$\tilde{v}_{l,m} = \begin{bmatrix} u_m & e^{j\frac{4\pi l}{O_1N_1}} u_m & \ldots & e^{j\frac{4\pi l(N_1/2-1)}{O_1N_1}} u_m \end{bmatrix}^T$$

Optionally, the spatial domain information includes/is associated with one or more port (e.g., antenna port) parameters. Here, the first configuration information may include a port parameter. For example, the antenna port parameter may be used to indicate an antenna port (e.g., indicate a number of antenna ports). For example, the antenna port parameter may be used to indicate number of antenna ports in a first dimension (N1) and a second dimension (N2) and/or codebook subset restriction and/or a parameter (Ng). For example, the codebook subset restriction may be used for a single-panel codebook and/or a multi-panel codebook. For example, the reference signal (e.g., CSI-RS) port parameter may be used to indicate reference signal port information (port numbers and/or a number of reference signal ports). Here, the parameter Ng is used to represent a number of panels for example.

Optionally, the spatial domain information includes/is associated with one or more reference signal port parameters (or reference signal port information). Here, the first configuration information may include reference signal port parameter. For example, the reference signal (e.g., CSI-RS) port parameter may be used to indicate one or more reference signal port numbers. Optionally, the indicated reference signal port number may be based on a reference signal port number that a reference signal (or a reference signal resource) has. For example, the reference signal port number indicated by the reference signal port parameter may be all of or a subset of reference signal port numbers that a reference signal (or a reference signal resource) has. Here, a port number that a reference signal has is related to a port number parameter (e.g., nrofPorts). For example, when a CSI-RS resource is configured with the port number parameter (nrofPorts) which is equal to 8, the CSI-RS resource has 8 ports with eight port numbers starting from 3000, i.e., 3000+i, wherein a value range of i is {0, 1, 2, . . . , K−1}, wherein K is equal to a number corresponding to the port number parameter. In this example, the port numbers of the CSI resource are 3000, 3001, 3002, . . . , 3007. The reference signal port parameter may indicate a part of these ports. Optionally, the reference signal port parameter (e.g., by the method of a bitmap (bitmaps)) indicates port numbers and/or a number of ports. For example, the reference signal port parameter (directly) indicates port numbers 3001 and 3002. Optionally, the reference signal port parameter includes bitmaps with bits which are as many as the CSI-RS ports that the CSI-RS resource has. The bits of the bitmap are mapped (e.g., mapped to ports/mapped to port numbers) according to the increasing/decreasing order of values of the reference signals port numbers that the CSI-RS resource has. When a bit in the bitmap is '1', representing that a corresponding port is indicated; and when the bit in the bitmap is '0', representing that the corresponding port is not indicated. For example, when the bitmap is "01100000", the reference signal port parameter (directly) indicates the port numbers 3001 and 3002. Optionally, the reference signal port parameter includes a port index list. Each item of the port index list represents a CSI-RS port. For another example, the reference signal port parameter indicates a number (J) of ports, i.e., 3000+j or j, wherein a value range of j is {0, 1, 2, . . . , J−1}, wherein J is equal to the number indicated by the reference signal port parameter. Optionally, J is less than or equal to K. Optionally, when determining/calculating the CSI parameter, the UE renumbers the indicated port numbers (as the indication method described above). Optionally, when determining/calculating the CSI parameter, the UE renumbers the indicated port numbers based on the increasing order of the values (from small to large) of the indicated port numbers (as the indication method described above). Optionally, when determining/calculating the CSI parameter, the UE determines the CSI parameter based on the renumbered port numbers. For example, when the indicated port numbers of the reference signal resource are 3001, 3002, 3005, and 3006, the four ports may be renumbered according to the increasing order of the values of the ports. 3001 is renumbered to 3000, and 3002 to 3001, 3005 to 3002, and 3006 to 3003. Here, the reference signal port parameter is merely an example of the spatial domain parameter. The spatial domain parameter may also be a reference signal code division multiplexing (CDM) group (or port associated with CDM group) parameter or a reference signal port group parameter. There disclosure is not limited thereto. For example, an indicated port (number) is a port (number) corresponding to/associated with the indicated CDM group. Optionally, port information may be or may include information of a used port. Optionally, the port information may be or may include information of an unused/muted port. Optionally, the port information may be or may include CDM group information. A CDM group corresponds to/is associated with one or more ports. Optionally, the port information may be or may include information of a used CDM group. Optionally, the port information may be or may include information of an unused/muted CDM group.

Optionally, the spatial domain information may include the port information and/or the second spatial domain parameter.

Optionally, a first spatial domain parameter associated with a reference signal (resource) is determined according to the port information and/or the second spatial domain parameter.

Optionally, the second spatial domain parameter may be or may include a number N1 of ports of the first dimension and a number N2 of ports of the second dimension.

Optionally, the first spatial domain parameter may be or may include a number (N1_subset) of ports of the first dimension and a number (N2_subset) of ports of the second dimension.

Optionally, a product of the number (N1_subset) of ports of the first dimension included in/associated with the first spatial domain parameter and the number (N2_subset) of ports of the second dimension included in/associated with the first spatial domain parameter is less than or equal to a product of the number (N1) of ports of the first dimension included in/associated with the second spatial domain parameter and the number (N2) of ports of the second dimension included in/associated with the second spatial domain parameter.

Optionally, the product of the number (N1_subset) of ports of the first dimension included in/associated with the first spatial domain parameter and the number (N2_subset) of ports of the second dimension included in/associated with the first spatial domain parameter is in an integral multiple relationship (e.g., a multiple relationship of a power of 2) with the product of the number (N1) of ports of the first dimension included in/associated with the second spatial domain parameter and the number (N2) of ports of the second dimension included in/associated with the second spatial domain parameter.

Optionally, the number (N1_subset) of ports of the first dimension included in/associated with the first spatial domain parameter is less than or equal to the number (N1) of ports of the first dimension included in/associated with the second spatial domain parameter.

Optionally, the number (N2_subset) of ports of the second dimension included in/associated with the first spatial domain parameter is less than or equal to the number (N2) of ports of the second dimension included in/associated with the second spatial domain parameter.

Optionally, the number (N1_subset) of ports of the first dimension included in/associated with the first spatial domain parameter is in an integral multiple relationship (e.g., a multiple relationship of a power of 2) with the number (N1) of ports of the first dimension included in/associated with the second spatial domain parameter.

Optionally, the number (N2_subset) of ports of the second dimension included in/associated with the first spatial domain parameter is in an integral multiple relationship (e.g., a multiple relationship of a power of 2) with the number (N2) of ports of the second dimension included in/associated with the second spatial domain parameter.

How N1_subset and/or N2_subset is determined by port ID information, N1, and N2 will be described below by taking for example that: the port information is the port ID information, the first spatial domain parameter is the number (N1_subset) of ports of the first dimension and the number (N2_subset) of ports of the second dimension, and the second spatial domain parameter is the number N1 of ports of the first dimension and the number N2 of ports of the second dimension.

Optionally, N1_subset is determined based on a number of port IDs (port IDs corresponding to the information) in a range of 0 (+3000) to N1−1 (+3000) (in normalized port IDs) corresponding to/associated with the port ID information. Optionally, normalized port IDs refers to the port IDs generated by subtracting a value of the minimum (or maximum) port ID in a set of port IDs corresponding to/associated with the port ID information from the set of port IDs. Optionally, N2_subset is determined based on N1_subset. Optionally, N2_subset=N_port/(2*N1_subset). N_port may be a number of port IDs (e.g., a number of ports corresponding to the port ID information). Optionally, N1_subset is equal to a number of port IDs in a range of 0 (+3000) to N1−1 (+3000) (in normalized port IDs) corresponding to/associated with the port ID information. For example, the port IDs are 3000, 3001, 3004, and 3005; N1=2; and N2=2. Since the number of ports is 2 in the range of 3000 to 3001 (i.e., 3000+N1−1), N1_subset=2. For example, the port IDs are 3000, 3001, 3004, and 3005; N1=2; and N2=2. Since the normalized port numbers (0, 1, 4, and 5) are within the range of 0 to 1 (i.e., N1−1) and the number of ports is 2, N1_subset=2.

Optionally, N1_subset is determined based on a (maximum) number of continuous port IDs corresponding to/associated with the port ID information. Optionally, N1_subset is determined based on the (maximum) number of continuous port IDs corresponding to/associated with the port ID information and N1. Optionally, N1_subset=N_con, wherein N_con represents the (maximum) number of continuous port IDs corresponding to/associated with the port ID information. For example, N1_subset=min (N_con, N1), wherein N_con represents the (maximum) number of continuous port IDs corresponding to/associated with the port ID information. For example, when the port IDs are 3000, 3001, 3004, 3005, and 3006, the maximum number of continuous port IDs is 3.

Optionally, N2_subset is determined based on a number of port IDs (port IDs corresponding to the information) in a range of 0 (+3000) to N2−1 (+3000) (in normalized port IDs) corresponding to/associated with the port ID information. Optionally, normalized port IDs refers to the port IDs generated by subtracting a value of the minimum (or maximum) port ID in a set of port IDs corresponding to/associated with the port ID information from the set of port IDs. Optionally, N1_subset is determined based on N2_subset. Optionally, N1_subset=N_port/(2*N2_subset). N_port may be a number of port IDs (e.g., a number of ports corresponding to the port ID information). Optionally, N2_subset is equal to a number of port IDs in a range of 0 (+3000) to N2−1 (+3000) (in normalized port IDs) corresponding to/associated with the port ID information. For example, the port IDs are 3000, 3001, 3004, and 3005; N1=2; and N2=2. Since the number of ports is 2 in the range of 3000 to 3001 (i.e., 3000+N2−1), N2_subset=2. For example, the port IDs are 3000, 3001, 3004, and 3005; N1=2; and N2=2. Since the normalized port numbers (0, 1, 4, and 5) are within the range of 0 to 1 (i.e., N2−1) and the number of ports is 2, N1_subset=2.

Optionally, N2_subset is determined based on a (maximum) number of continuous port IDs corresponding to/associated with the port ID information. Optionally, N2_subset is determined based on the (maximum) number of continuous port IDs corresponding to/associated with the port ID information and N1. Optionally, N2_subset=N_con, wherein N_con represents the (maximum) number of continuous port IDs corresponding to/associated with the port ID information. For example, N2_subset=min (N_con, N2), wherein N_con represents the (maximum) number of continuous port IDs corresponding to/associated with the port ID information. For example, when the port IDs are 3000, 3001, 3004, 3005, and 3006, the maximum number of continuous port IDs is 3.

Optionally, the method described above needs to meet a condition that the codebook type associated with the reference signal (resource) is single-panel codebook. For example, the condition refers to that a codebook type parameter (codebookType) (based on RRC signaling) is set to 'typeISinglePanel'.

In the method described above, the spatial domain parameter associated with the reference signal (resource) may be determined (implicitly) according to port indication information, reducing a signaling overhead generated by related spatial domain parameter indication.

Optionally, the spatial domain information may include the port information and/or the second spatial domain parameter.

Optionally, the first spatial domain parameter associated with the reference signal (resource) is determined according to the port information and/or the second spatial domain parameter. Optionally, the UE receives indication information/configuration information (from the base station). Optionally, the UE receives indicated/configured information (e.g., port information) (from the base station). Optionally, the UE receives information (e.g., port information) (from the base station). Optionally, the port information may be or may include the port ID information.

Optionally, the second spatial domain parameter may be or may include the number N1 of ports of the first dimension and the number N2 of ports of the second dimension and/or the parameter Ng. Ng is a parameter used to represent a number of panels for example.

Optionally, the first spatial domain parameter may be or may include the number N1_subset of ports of the first dimension and the number N2_subset of ports of the second dimension and/or a parameter Ng_subset. Ng_subset is a parameter used to represent a number of panels for example.

Optionally, the product of the number (N1_subset) of ports of the first dimension included in/associated with the first spatial domain parameter and the number (N2_subset) of ports of the second dimension included in/associated with the first spatial domain parameter is less than or equal to the product of the number (N1) of ports of the first dimension included in/associated with the second spatial domain parameter and the number (N2) of ports of the second dimension included in/associated with the second spatial domain parameter.

Optionally, the product of the number (N1_subset) of ports of the first dimension included in/associated with the first spatial domain parameter and the number (N2_subset)

of ports of the second dimension included in/associated with the first spatial domain parameter is in an integral multiple relationship (e.g., a multiple relationship of a power of 2) with the product of the number (N1) of ports of the first dimension included in/associated with the second spatial domain parameter and the number (N2) of ports of the second dimension included in/associated with the second spatial domain parameter.

Optionally, the number (N1_subset) of ports of the first dimension included in/associated with the first spatial domain parameter is less than or equal to the number (N1) of ports of the first dimension included in/associated with the second spatial domain parameter.

Optionally, the number (N2_subset) of ports of the second dimension included in/associated with the first spatial domain parameter is less than or equal to the number (N2) of ports of the second dimension included in/associated with the second spatial domain parameter.

Optionally, the number (N1_subset) of ports of the first dimension included in/associated with the first spatial domain parameter is in an integral multiple relationship (e.g., a multiple relationship of a power of 2) with the number (N1) of ports of the first dimension included in/associated with the second spatial domain parameter.

Optionally, the number (N2_subset) of ports of the second dimension included in/associated with the first spatial domain parameter is in an integral multiple relationship (e.g., a multiple relationship of a power of 2) with the number (N2) of ports of the second dimension included in/associated with the second spatial domain parameter.

Optionally, the parameter (Ng_subset) included in/associated with the first spatial domain parameter is less than or equal to the parameter (Ng) included in/associated with the second spatial domain parameter.

Optionally, the parameter (Ng_subset) included in/associated with the first spatial domain parameter is in an integral multiple relationship (e.g., a multiple relationship of a power of 2) with the parameter (Ng) included in/associated with the second spatial domain parameter.

How at least one of N1_subset, N2_subset, and Ng_subset is determined by the port ID information, N1, N2, Ng, and Ng_subset will be described below by taking for example that: the port information is the port ID information, the first spatial domain parameter is the number N1_subset of ports of the first dimension and the number N2_subset of ports of the second dimension and/or the parameter Ng_subset, and the second spatial domain parameter is the number N1 of ports of the first dimension and the number N2 of ports of the second dimension and/or the parameter Ng.

Optionally, N1_subset is equal to N1.

Optionally, N1_subset is determined based on a number of port IDs (port IDs corresponding to the information) in a range of 0 (+3000) to N1−1 (+3000) (in normalized port IDs) corresponding to/associated with the port ID information. Optionally, normalized port IDs refers to the port IDs generated by subtracting a value of the minimum (or maximum) port ID in a set of port IDs corresponding to/associated with the port ID information from the set of port IDs. Optionally, N1_subset*N2_subset is determined based on a number (N_total) of port IDs (port IDs corresponding to the information) in a range of 0 (+3000) to N1*N2−1 (+3000) corresponding to the port ID information. Optionally, N2_subset is determined based on N1_subset. Optionally, N2_subset=N_total/N1_subset. Optionally, N2_subset=N_port/(2*Ng_subset*N1_subset). N_port may be a number of port IDs (e.g., a number of ports corresponding to/associated with the port ID information). Optionally, N1_subset is equal to a number of port IDs in the range of 0 (+3000) to N1−1 (+3000) corresponding to the port ID information. For example, the port IDs are 3000, 3001, 3004, and 3005; 3008, 3009, 3012, and 3013; N1=2; N2=2; and Ng=2. Since the number of ports is 2 in the range of 3000 to 3001 (i.e., 3000+N1−1), N1_subset=2. Since the number of ports is 2 in a range of 3000 to 3003 (i.e., 3000+N1*N2−1), N2_subset=N_total/N1_subset=1. For example, the port IDs are 3000, 3001, 3004, and 3005; 3008, 3009, 3012, and 3013; N1=2; N2=2; and Ng=2. Since the number of ports is 2 when the normalized port IDs (0, 1, 4, 5, 8, 9, 12, and 13) is in the range of 0 to 1 (i.e., N1−1), N1_subset=2.

Optionally, N1_subset is determined based on a (maximum) number of continuous port IDs corresponding to/associated with the port ID information. Optionally, N1_subset is determined based on the (maximum) number of continuous port IDs corresponding to/associated with the port ID information and N1. Optionally, N1_subset=N_con, wherein N_con represents the (maximum) number of continuous port IDs corresponding to/associated with the port ID information. For example, N1_subset=min (N_con, N1), wherein N_con represents the (maximum) number of continuous port IDs corresponding to/associated with the port ID information. For example, when the port IDs are 3000, 3001, 3004, 3005, and 3006, the maximum number of continuous port IDs is 3.

Optionally, N2_subset is equal to N2.

Optionally, N2_subset is determined based on a number of port IDs (port IDs corresponding to the information) in a range of 0 (+3000) to N2−1 (+3000) (in normalized port IDs) corresponding to/associated with the port ID information. Optionally, normalized port IDs refers to the port IDs generated by subtracting a value of the minimum (or maximum) port ID in a set of port IDs corresponding to/associated with the port ID information from the set of port IDs. Optionally, N1_subset*N2_subset is determined based on a number (N_total) of port IDs (port IDs corresponding to the information) in a range of 0 (+3000) to N1*N2−1 (+3000) corresponding to the port ID information. Optionally, N1_subset is determined based on N2_subset. Optionally, N1_subset=N_total/N2_subset. Optionally, N1_subset=N_port/(2*Ng_subset*N2_subset). N_port may be a number of port IDs (e.g., a number of ports corresponding to/associated with the port ID information). Optionally, N2_subset is equal to a number of port IDs in the range of 0 (+3000) to N2−1 (+3000) corresponding to the port ID information. For example, the port IDs are 3000, 3001, 3004, and 3005; 3008, 3009, 3012, and 3013; N1=2; N2=2; and Ng=2. Since the number of ports is 2 in the range of 3000 to 3001 (i.e., 3000+N2−1), N2_subset=2. Since the number of ports is 2 in the range of 3000 to 3003 (i.e., 3000+N1*N2−1), N1_subset=N_total/N2_subset=1. For example, the port IDs are 3000, 3001, 3004, and 3005; 3008, 3009, 3012, and 3013; N1=2; N2=2; and Ng=2. Since the number of ports is 2 when the normalized port IDs (0, 1, 4, 5, 8, 9, 12, and 13) is in the range of 0 to 1 (i.e., 3000+N2−1), N2_subset=2.

Optionally, N2_subset is determined based on a (maximum) number of continuous port IDs corresponding to/associated with the port ID information. Optionally, N2_subset is determined based on the (maximum) number of continuous port IDs corresponding to/associated with the port ID information and N1. Optionally, N2_subset=N_con, wherein N_con represents the (maximum) number of continuous port IDs corresponding to/associated with the port ID information. For example, N2_subset=min (N_con, N2), wherein N_con represents the (maximum) number of continuous port IDs corresponding to/associated with the port ID information. For example, when the port IDs are 3000, 3001, 3004, 3005, and 3006, the maximum number of continuous port IDs is 3.

Optionally, the method described above needs to meet a condition that the codebook type associated with the reference signal (resource) is multi-panel codebook. In other words, the condition refers to that a codebook type parameter (codebookType) (based on RRC signaling) is set to 'typeI-MultiPanel'.

In this example, the spatial domain parameter associated with the reference signal (resource) may be determined (implicitly) according to port indication information, reducing a signaling overhead generated by related spatial domain parameter indication.

Optionally, the spatial domain information may include the first spatial domain parameter and/or the second spatial domain parameter.

Optionally, ports (or a port subset) associated with a reference signal (resource) are determined according to at least one of the first spatial domain parameter, the second spatial domain parameter, and a port set associated with the reference signal (resource). Optionally, ports (or a port subset) associated with a reference signal (resource) are determined according to the first spatial domain parameter and the second spatial domain parameter. Optionally, ports associated with a reference signal are a subset of ports corresponding to/associated with the second spatial domain parameter. Optionally, a number of ports of a reference signal (resource) refers to ports of the reference signal (e.g., CSI-RS). For example, the ports of the reference signal (resource) are based on a parameter in the configuration information of the reference signal resource (e.g., nrofPorts in resourceMapping). That is, the ports (set) associated with/corresponding to the reference signal (resource) are 3000, 3001, . . . , 3000+j−1, wherein j is equal to a value of the parameter nrofPorts. Optionally, ports (or a port subset) associated with a reference signal (resource) are a part of ports (set) associated with/corresponding to the reference signal (resource).

Optionally, (all) port IDs of ports (or a port subset) associated with a reference signal (resource) are continuous.

Optionally, the method needs to meet the condition that the codebook type associated with the reference signal (resource) is multi-panel codebook. In other words, the condition refers to that the codebook type parameter (codebookType) (based on RRC signaling) is set to 'typeI-MultiPanel'.

Optionally, the UE determines the CSI parameter of (associated with) a reference signal resource according to ports (or a port subset) associated with the reference signal (resource). Optionally, when determining the CSI parameter, the UE determines (assumes) that among the ports (or, the port subset), a port with the smallest index is port (3000+) 0, a port with the second smallest index is port (3000+) 1, and so on.

Optionally, the second spatial domain parameter may be or may include the number N1 of ports of the first dimension and the number N2 of ports of the second dimension and/or the parameter Ng. Ng is a parameter used to represent a number of panels for example.

Optionally, the first spatial domain parameter may be or may include a first parameter (Ng_subset) and/or a second parameter. The first parameter is a parameter used to represent a number of panels for example. The second parameter is a parameter (N_offset) used to indicate an antenna port offset or a panel offset.

How ports (or a port subset) associated with the first spatial domain parameter/reference signal are determined will be described below by taking for example that: the first spatial domain parameter is the first parameter (Ng_subset) and an offset parameter, and the second spatial domain parameter is a number N1 of ports of the first dimension, a number N2 of ports of the second dimension, and the parameter (Ng).

Optionally, the ports (or, the port subset) associated with first spatial domain parameter/reference signal are determined based on the first spatial domain parameter and/or the second spatial domain parameter. Optionally, the ports (or, the port subset) associated with the first spatial domain parameter/reference signal are determined based on at least one of the first parameter (Ng_subset), the offset parameter (N_offset), the number of ports of the first dimension associated with the second spatial domain parameter, the number of ports of the second dimension associated with the second spatial domain parameter, and the parameter (Ng) associated with the second spatial domain parameter. Optionally, a number of the ports (or, the port subset) associated with the first spatial domain parameter/reference signal is determined based on the second spatial domain parameter (associated number N1 of ports of the first dimension, number N2 of ports of the second dimension, and parameter (Ng)). Optionally, the number of the ports (the port subset) associated with the first spatial domain parameter/reference signal is determined based on the second spatial domain parameter (associated number N1 of ports of the first dimension, number N2 of ports of the second dimension, and/or parameter (Ng)). Optionally, a port offset of the ports (or, the port subset) associated with the first spatial domain parameter/reference signal is determined based on the second spatial domain parameter (associated number N1 of ports of the first dimension and number N2 of ports of the second dimension) and/or the first spatial domain parameter (associated Ng_subset and/or offset parameter).

For example, the ports (or, the port subset) associated with the first spatial domain parameter/reference signal are 3000+K_offset, 3000+K_offset+1, . . . , 3000+K_offset+2*Ng_subset*N1*N2−1. K_offset is based on N_offset. Optionally, K_offset is based on at least one of N_offset, N1, N2, and N_subset. For example, K_offset=N_offset. Optionally, N_offset may be 0 or a positive integer. For example, N_offset may be one of 0, 3, 7, and 15. For example, K_offset=N_offset*2*N1*N2. For example, K_offset=N_offset*2*N1*N2*N_subset. Optionally, N_offset may be one of 0, 1, 2, or 3. For example, K_offset=(N_offset−1)*2*N1*N2. For example, K_offset=(N_offset−1)*2*N1*N2*N_subset. Optionally, N_offset may be one of 1, 2, 3, and 4. Optionally, Ng_subset may be at least one of 1, 2, and 4.

For example, a port (or, a port subset) associated with the first spatial domain parameter/reference signal is K_offset, K_offset+1, . . . , K_offset+2*N1*N2*Ng_subset−1. K_offset is based on N_offset. Optionally, K_offset is based on at least one of N_offset, N1, N2, and N_subset. For example, K_offset=N_offset. Optionally, N_offset may be 0 or a positive integer. For example, N_offset may be one of 0, 3, 7, and 15. For example, K_offset=N_offset*2*N1*N2. For example, K_offset=N_offset*2*N1*N2*N_subset. Optionally, N_offset may be one of 0, 1, 2, or 3. For example, K_offset=(N_offset−1)*2*N1*N2. For example, K_offset=

(N_offset−1)*2*N1*N2*N_subset. Optionally, N_offset may be one of 1, 2, 3, and 4. Optionally, Ng_subset may be at least one of 1, 2, and 4.

Optionally, in this example, the number of ports of the first dimension associated with/corresponding to the ports (or, the port subset) associated with the first spatial domain parameter/reference signal is determined based on N1 (associated with the second spatial domain parameter). Optionally, in this example, the number of ports of the first dimension associated with/corresponding to the ports (or, the port subset) associated with the first spatial domain parameter/reference signal is equal to N1 (associated with the second spatial domain parameter).

Optionally, in this example, the number of ports of the second dimension associated with/corresponding to the ports (or, the port subset) associated with the first spatial domain parameter/reference signal is determined based on N2 (associated with the second spatial domain parameter). Optionally, in this example, the number of ports of the first dimension associated with/corresponding to the ports (or, the port subset) associated with the first spatial domain parameter/reference signal is equal to N2 (associated with the second spatial domain parameter).

In the method described above, the ports (or, the port subset) associated with the reference signal (resource) may be determined (implicitly) according to the spatial domain parameters, reducing a signaling overhead generated by related indication.

Optionally, the spatial domain information includes/is associated with one or more port parameter/port indication information. Here, the first configuration information may include port parameter/port indication information. For example, a port parameter/port indication may be a port indication (e.g., non-PMI-PortIndication) for rank indicator (RI) and/or CQI determination/calculation.

Optionally, when a CSI report is indicated (e.g., indicated by the spatial domain information) a spatial domain parameter (e.g., a codebook parameter) and the reference signal resource of the CSI report is indicated (e.g., indicated by the spatial domain information) a port parameter, a number of ports associated with the codebook parameter is related to (e.g., the same as, or in an integral multiple relationship with) a number of ports associated with the port parameter. Optionally, the number of ports associated with the codebook parameter is $2*N_1*N_2$. Optionally, the codebook parameter includes $N_1$ and $N_2$. $N_1$ includes a codebook first-dimension number parameter. $N_2$ includes a codebook second-dimension number parameter. For example, if the spatial domain parameter provides the number $N_1$ of ports of the first dimension and the number $N_2$ of the second dimension and is associated with/corresponds to the single-panel codebook (e.g., the codebook parameter is set to type I single panel; for example, parameter codebook Type is set to ‘typeISinglePanel’), a particular number of ports is equal to 2*N1*N2. Optionally, the number of ports associated with the codebook parameter is $2*Ng*N_1*N_2$. For example, if the spatial domain parameter provides the number N1 of ports of the first dimension and the number N2 of the second dimension and/or the parameter Ng and is associated with/corresponds to multi-panel codebook (e.g., the codebook parameter is set to type I multiple panels; for example, parameter codebookType is set to ‘typeI-MultiPanel’), a particular number of ports is equal to 2*Ng*N1*N2. Here, the parameter Ng is used to represent a number of panels for example. The advantage of this method is that a number of ports associated with CSI-RS reporting (for CSI parameter calculation) is related to/consistent with a number of ports of a reference signal associated with CSI, avoiding obscure UE behaviors in case of unrelated/inconsistent numbers of ports.

Optionally, the UE determines the CSI parameter according to the spatial domain parameter/spatial domain information (associated with a CSI report). For example, the UE determines the CSI parameter according to codebook configuration information related to the spatial domain parameter associated with a CSI report and/or a reference signal port. The CSI parameter is, for example, at least one of a CQI index, a precoder matrix indicator (PMI) and RI, layer 1-reference signal receiving power (L1-RSRP), and layer 1-signal to interference plus noise ratio (L1-SINR). Optionally, determining the CSI parameter may be determining a CSI feedback. determining the CSI parameter may also be determining a report carrying the CSI parameter (i.e., determining a CSI report). Optionally, the CSI parameter may be a CSI feedback. The CSI parameter may also be a report carrying the CSI parameter (i.e., a CSI report).

The advantage of this method is that a base station may adjust/indicate the spatial domain parameter/assumption (for CSI calculation) of a reference signal associated with a CSI report while triggering the CSI report, thereby improving the system flexibility.

The first information includes/is associated with the frequency-domain information. Optionally, the first parameter indicated or updated by the first information includes a frequency-domain parameter for the frequency-domain information to indicate or update a reference signal resource or a frequency-domain parameter of a CSI report. Optionally, the first parameter (e.g., frequency-domain parameter) associated with a CSI report in association with the first trigger state is indicated or updated by the DCI or the first information (e.g., spatial domain information) associated with the first trigger state. Optionally, the frequency-domain information includes/is associated with one or more subband parameter/subband information. Here, the first configuration information may include subband parameter/subband information. For example, the subband parameter/subband information is used to indicate a size of a subband. The parameter is subbandSize for example. For example, the subband parameter/subband information is used to indicate a continuous or discontinuous subset of (one or more) subband(s) in BWP. Optionally, CSI may be reported based on the subset. The frequency-domain information is reportFreqConfiguration or csi-ReportingBand for example. Optionally, the frequency-domain information includes a PMI format indicating parameter/PMI format indicating parameter information. For example, the PMI format indicating parameter information is used for indicating that the UE reports a wideband PMI (or a single PMI) or a subband PMI (or a plurality of PMIs). The frequency-domain information/frequency-domain parameter is pmi-FormatIndicator for example. Optionally, the frequency-domain information includes a CQI format indicating parameter/CQI format indicating parameter information. For example, the CQI format indicating parameter information is used for indicating that the UE reports a wideband CQI (or a single CQI) or a subband CQI (or a plurality of CQIs). The frequency-domain information/frequency-domain parameter is cqi-FormatIndicator for example. In the case of the UE being configured with the subband CQI, the UE may be further configured with/indicated a CQI bit parameter. This parameter is used to indicate a number of bits of CQI reported over each subband. The number of bits may be 2 or 4. This parameter is cqi-BitsPerSubband for example. Optionally, the frequency-domain information includes/is associated with physical resource block (PRB) bundling information/ parameter. For example, the PRB bundling information/parameter is used for indicating a PRB bundling size to assume (assumed by the UE) when calculating the CSI parameter (e.g., CQI). For example, the PRB bundling information/parameter is used for indicating a PRB bundling size to assume for CQI calculating (assumed by the UE) when the quantity of a CSI report is 'CRI-RI-i1-CQI' or 'CRI/RI/i1/CQI' and when the CQI is calculated. This parameter is pdsch-BundleSizeForCSI for example.

Optionally, the frequency-domain information includes/is associated with one or more frequency-domain information of measurement resource. Here, the first configuration information may include frequency-domain information of measurement resource. The frequency-domain information of measurement resource includes, for example, frequency-domain occupation information of a CSI measurement resource (e.g., CSI-FrequencyOccupation). Optionally, the frequency-domain information of measurement resource includes a starting resource block (RB) information (e.g., startingRB) and/or number-of-RBs information (e.g., nrofRBs). Optionally, the frequency-domain information of measurement resource is related to a measurement reference signal resource (e.g., CSI-RS) for CSI reporting.

Optionally, the UE determines the CSI parameter (associated with a CSI report) according to the frequency-domain parameter. Optionally, determining the CSI parameter may be determining a CSI feedback. determining the CSI parameter may also be determining a report carrying the CSI parameter (i.e., determining a CSI report). Optionally, the CSI parameter may be a CSI feedback. The CSI parameter may also be a report carrying the CSI parameter (i.e., a CSI report).

The advantage of this method is that a base station may adjust/indicate the frequency-domain parameter/assumption (for CSI calculation) of a reference signal associated with a CSI report while triggering the CSI report, thereby improving the system flexibility.

The first information includes/is associated with CQI table information. Optionally, the first parameter indicated or updated by the first information includes a CQI table parameter for the CQI table information to indicate or update a reference signal resource or a CQI table parameter of a CSI report. Optionally, the first parameter (e.g., CQI table) associated with a CSI report in association with the first trigger state is indicated or updated by the DCI or the first information (e.g., CQI table information) associated with the first trigger state. Optionally, the first information includes/is associated with one or more CQI tables. Optionally, the first information includes/is associated with one or more CQI table information. Here, the first configuration information may include CQI table information. Optionally, the CQI table information is used for indicating a CQI table used in CQI calculating. For example, the CQI table information may indicate/select at least one of a 4-bit CQI table, a 4-bit CQI table 2, a 4-bit CQI table 3, and a 4-bit CQI table 4. The CQI table information is cqi-Table for example.

Optionally, the UE determines the CSI parameter (associated with a CSI report) according to the CQI table information. Optionally, the UE determines the CSI parameter (associated with a CSI report) according to an indicated CQI table. Optionally, determining the CSI parameter may be determining a CSI feedback. determining the CSI parameter may also be determining a report carrying the CSI parameter (i.e., determining a CSI report). Optionally, the CSI parameter may be a CSI feedback. The CSI parameter may also be a report carrying the CSI parameter (i.e., a CSI report).

The advantage of this method is that a base station may adjust/indicate the CQI table parameter/assumption (for CQI calculating) of a reference signal associated with a CSI report while triggering the CSI report, thereby improving the system flexibility.

The CQI table described above may be equivalently replaced with L1-RSRP table or L1-SINR table. Optionally, one or more L1-RSRP tables are different in quantization step size and/or quantization interval. Optionally, one or more L1-SINR tables are different in quantization step size and/or quantization interval. Optionally, the L1-RSRP table may be for absolute quantization. Optionally, the L1-RSRP table may be for differential quantization. Optionally, the L1-SINR table may be for absolute quantization. Optionally, the L1-SINR table may be for differential quantization.

The first information includes/is associated with measurement information. Optionally, the first parameter indicated or updated by the first information includes a measurement parameter for the measurement information to indicate or update a reference signal resource or a measurement parameter of a CSI report. Optionally, the first parameter (e.g., a number of measured reference signals to be reported; for another example, a time-domain measurement restriction parameter) associated with a CSI report in association with the first trigger state is indicated or updated by the DCI or the first information (e.g., measurement information) associated with the first trigger state. Optionally, the first information includes/is associated with one or more measurement information. Here, the first configuration information may include measurement information. Optionally, the measurement information includes/is associated with the number of measured RS resources to be reported. For example, the measurement information may be the number of measured reference signals to be reported in a non-group-based report. Optionally, a default value of the number is 1. The information is nrofReportedRS for example. Optionally, the measurement information may indicate whether there is a time-domain measurement restriction for a channel or a signal (e.g., the time-domain measurement restriction for signal measurements and/or the time-domain measurement restriction for interference measurements). Optionally, the measurement information includes/is associated with the time-domain measurement restriction for the channel/signal measurements. This parameter is timeRestrictionForChannelMeasurements for example. Optionally, the measurement information/measurement parameter includes/is associated with the time-domain measurement restriction for the interference measurements. This parameter is timeRestrictionForChannelMeasurements for example. When a CSI report is configured with the measurement parameter (for indicating the time-domain measurement restriction for the channel/signal measurements), the UE derives the measurements for calculating CSI parameter (reported in uplink slot n) based on the latest RS (for example, NZP CSI-RS and/or SSB) no later than the CSI reference resource. When a CSI report is configured without measurement parameter (for indicating the time-domain measurement restriction for the channel/signal measurements), the UE derives the measurements for calculating CSI parameter (reported in uplink slot n) based on the RS (for example, NZP CSI-RS and/or SSB) no later than the CSI reference resource. Optionally, the measurements include the channel measurements and/or the interference measurements.

Optionally, the UE determines the CSI parameter (associated with a CSI report) according to the measurement parameter. Optionally, determining the CSI parameter may be determining a CSI feedback. determining the CSI parameter may also be determining a report carrying the CSI parameter (i.e., determining a CSI report). Optionally, the CSI parameter may be a CSI feedback. The CSI parameter may also be a report carrying the CSI parameter (i.e., a CSI report).

The advantage of this method is that a base station may adjust/indicate the measurement parameter/assumption (for CSI calculation) of a reference signal associated with a CSI report while triggering the CSI report, thereby improving the system flexibility.

The first information includes/is associated with CSI report container information. Optionally, the first parameter indicated or updated by the first information includes a CSI report container parameter for the CSI report container information to indicate or update a reference signal resource or a CSI report container parameter of a CSI report. Optionally, the first parameter (e.g., CSI report container parameter) associated with a CSI report in association with the first trigger state is indicated or updated by the DCI or the first information (e.g., CSI report container information) associated with the first trigger state. Optionally, the CSI report container information includes/is associated with one or more physical uplink control channel (PUCCH) resources and/or a BWP identity (ID) of each PUCCH resource. Here, the first configuration information may include PUCCH resource information. Optionally, the CSI report container information is used for indicating which PUCCH resource is used for reporting (e.g., CSI reporting). For example, this information may be used for periodic CSI reporting and semi-persistent CSI reporting. Optionally, the CSI report container information includes/is associated with one or more power control parameters (e.g., p0 and/or alpha). Here, alpha refers to alpha value for PUSCH with grant (except msg3). Here, p0 refers to P0 value for PUSCH with grant (except msg3) in steps of 1 dB. Here, the first configuration information may include a power control parameter. Optionally, the CSI report container information is used for determining the power control parameter transmitted by a CSI report (e.g., PUSCH carrying the CSI report). For example, this information indication may indicate that an index of p0-alpha group is used for determining the power control parameter transmitted by a CSI report (e.g., PUSCH carrying the CSI report).

Optionally, the UE determines the CSI parameter (associated with a CSI report) according to the CSI report container parameter. Optionally, determining the CSI parameter may be determining a CSI feedback. determining the CSI parameter may also be determining a report carrying the CSI parameter (i.e., determining a CSI report). Optionally, the CSI parameter may be a CSI feedback. The CSI parameter may also be a report carrying the CSI parameter (i.e., a CSI report).

The advantage of this method is that the base station may adjust/indicate the CSI report container parameter associated with a CSI report while triggering the CSI report, thereby improving the system flexibility.

Optionally, the first parameter associated with a CSI report in association with the first trigger state is indicated or updated by the DCI. Here, the DCI not only initiates the first trigger state but also includes the first information. Here, the first parameter (e.g., frequency-domain parameter) associated with a CSI report in association with the first trigger state is indicated or updated by the first information associated with/included in the DCI. For the description of the first information indicating or updating the first parameter, see the above description. Optionally, the DCI includes the first information. Optionally, the first information is indicated by a DCI field. Optionally, the first information may be indicated by one or more DCI fields (of one DCI/in the DCI format). Optionally, the one or more DCI fields are configured by higher-level signaling. Optionally, a number of the one or more DCI fields is configured or predefined by higher-level signaling (e.g., the number is one of 1, 2, 3, and 4). Optionally, a size (e.g., a bit width) of (at least one or each of) the one or more DCI fields is configured by higher-level signaling. Optionally, the size of the DCI field is related to the number of configuration information or index information associated with the first information. For example, the size of the DCI field is determined based on a number of (candidate) configuration information or index information corresponding to/associated with the first information.

A mapping relationship between one or more DCI fields for indicating the first information and a CSI report triggered by the DCI may be determined by at least one of the following methods.

Method I

One or more CSI reports are triggered or activated by the DCI, wherein the one or more DCI fields are related to the one or more CSI reports. Optionally, the one or more DCI fields are in one-to-one correspondence with the one or more CSI reports. Optionally, the one or more DCI fields are in one-to-one correspondence with the one or more CSI reports according to an increasing/decreasing order of the values of CSI report configuration IDs. For example, N DCI fields are configured in the DCI and the DCI triggers N CSI reports (or, the DCI triggers CSI reports as many as the number N of the DCI fields), a first DCI field is associated with a first CSI report (a CSI report with the smallest CSI report configuration ID); a second DCI field is associated with a second CSI report (a CSI report with the second smallest CSI report configuration ID), and so on. Optionally, the number of the one or more DCI fields is greater than or equal to the number of the one or more CSI reports. Optionally, the first M DCI fields of the one or more DCI fields are used to indicate first parameters of the corresponding CSI reports, wherein M represents the number of the CSI reports triggered by the DCI. For example, N DCI fields are configured in the DCI and the DCI triggers M CSI reports (e.g., M is less than or equal to N), the first DCI field is associated with the first CSI report (e.g., the CSI report with the smallest CSI report configuration ID); the second DCI field is associated with the second CSI report (e.g., the CSI report with the second smallest CSI report configuration ID), and so on. Optionally, here, reports triggered by the DCI may be (all) aperiodic reports or may be (all) semi-persistent reports. Optionally, the CSI report configuration ID includes a semi-persistent CSI report configuration ID. Optionally, the CSI report configuration ID includes an aperiodic CSI report configuration ID. Optionally, the DCI field includes a codepoint (e.g., a codepoint having a value of 0), representing that the corresponding/associated CSI report is not indicated (by the first information). Optionally, the DCI field further includes other codepoints (e.g., non-zero codepoints), wherein the codepoints represent that the corresponding/associated CSI reports are indicated (by the first information).

Method II

The DCI triggers or activates (one) CSI report and the CSI report is associated with one or more reference signal resources (or a reference signal resource set), wherein the one or more DCI fields are related to one or more reference signal resources associated with the CSI report. Optionally, the one or more DCI fields are in one-to-one correspondence with the one or more reference signal resources. Optionally, the one or more DCI fields are in one-to-one correspondence with the one or more reference signal resources according to an increasing/decreasing order of the value of reference signal resource IDs (e.g., resource configuration IDs). For example, N DCI fields are configured in the DCI and CSI reports triggered by the DCI are associated with N reference signal resources (or, the DCI triggers the reference signal resources as many as the number N of the DCI fields), a first DCI field is associated with a first reference signal resource (e.g., a reference signal resource with the smallest reference signal ID); a second DCI field is associated with a second reference signal resource (e.g., a reference signal resource with the second smallest reference signal resource ID; for another example, a second reference signal resource in a reference signal resource set), and so on. Optionally, the number of the one or more DCI fields is greater than or equal to the number of the one or more reference signal resources. Optionally, the first P DCI fields of the one or more DCI fields are used to indicate first parameters of P reference signal resources for the corresponding CSI reports, wherein P represents the number of the reference signal resources for the CSI reports triggered by the DCI. For example, N DCI fields are configured in the DCI and the DCI triggers CSI reports associated with P reference signal resources (e.g., P is less than or equal to N), a first DCI field is associated with a first reference signal resource (e.g., a CSI report with the smallest reference signal resource; for another example, a first reference signal resource in a reference signal resource set); a second DCI field is associated with a second reference signal resource (e.g., a CSI report with the second smallest reference signal resource ID), and so on. Optionally, here, reports triggered by the DCI may be (all) aperiodic reports or may be (all) semi-persistent reports. Optionally, the CSI report configuration ID includes a semi-persistent CSI report configuration ID. Optionally, the CSI report configuration ID includes an aperiodic CSI report configuration ID. Optionally, the DCI field includes a codepoint (e.g., a codepoint having a value of 0), representing that the corresponding/associated reference signal resource is not indicated (by the first information). Optionally, the DCI field further includes other codepoints (e.g., non-zero codepoints), wherein the codepoints represent that the corresponding/associated reference signal resources are indicated (by the first information).

Method III

The DCI triggers or activates one or more CSI reports and each CSI report is associated with one or more reference signal resources, wherein the one or more DCI fields are in one-to-one correspondence with one or more reference signal resources associated with the one or more CSI reports. This method is a combination of the above-described Method I and Method II for determining the mapping relationship between one or more DCI fields for indicating the first information and the CSI reports triggered by the DCI. Optionally, the first P DCI fields of the one or more DCI fields are associated with a first CSI report (e.g., a CSI report with the smallest CSI report configuration ID), and the association method is as shown in Method II. Optionally, P+1 to 2P DCI fields of the one or more DCI fields are associated with a second CSI report (e.g., a CSI report with the second smallest CSI report configuration ID), and so on. Optionally, here, reports triggered by the DCI may be (all) aperiodic reports or may be (all) semi-persistent reports. Optionally, the CSI report configuration ID includes a semi-persistent CSI report configuration ID. Optionally, the CSI report configuration ID includes an aperiodic CSI report configuration ID. Optionally, the DCI field includes a codepoint (e.g., a codepoint having a value of 0), representing that the corresponding/associated reference signal resource is not indicated (by the first information). Optionally, the DCI field further includes other codepoints (e.g., non-zero codepoints), wherein the codepoints represent that the corresponding/associated reference signal resources are indicated (by the first information).

The advantage of this method is that the base station may adjust/indicate the parameter associated with a CSI report by the information carried in the DCI while triggering the CSI report, thereby improving the system flexibility.

Embodiment II

Figure 4B:
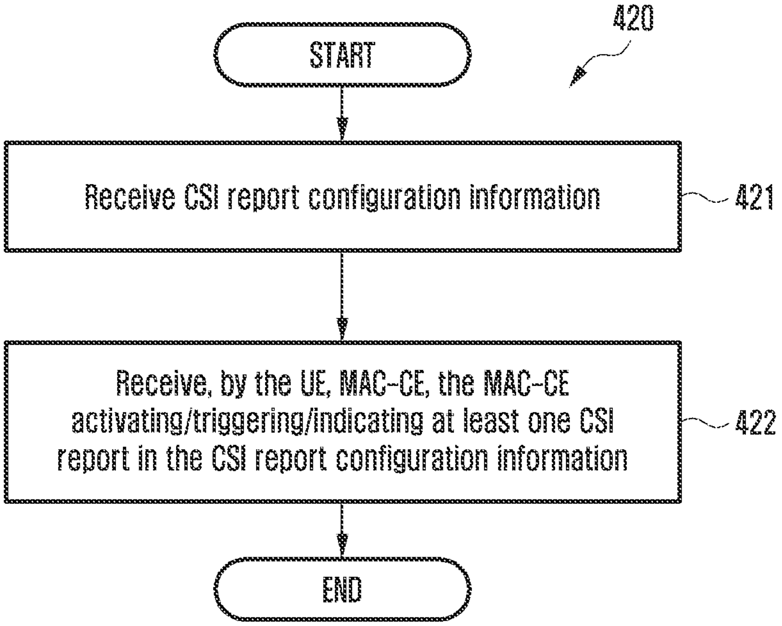
FIG. 4B illustrates a method performed by a UE according to various embodiments of the disclosure.

FIG. 4B illustrates a method 420 performed by a UE according to an embodiment of the disclosure. Optionally, first information is determined. Optionally, based on a first parameter associated with a CSI report, a CSI parameter is determined or at least one first CSI report is reported. Optionally, the first parameter is based on the first information.

The method 420 includes that: optionally, the UE receives CSI report configuration information at 421. Optionally, the report configuration information is used for configuring CSI report setting. For example, the CSI report configuration information includes csi-ReportConfigToAddModList and/or csi-ReportConfigToReleaseList.

Optionally, the UE receives a media access control-control element (MAC-CE) at 422. Optionally, the UE receives MAC-CE. Optionally, the MAC-CE activates/triggers/indicates at least one CSI report (configured) in the CSI report configuration information. Optionally, the MAC-CE includes serving cell information (e.g., a serving cell ID field). Optionally, the serving cell information indicates a serving cell for which the MAC-CE is applied. A length of the serving cell ID field is 5 bits for example. Optionally, the MAC-CE includes BWP information (e.g., a BWP ID field). Optionally, the BWP information indicates an uplink BWP to which the MAC-CE is applied. Optionally, a codepoint of the BWP ID field is the same as the codepoint of the BWP field in the DCI field. A length of the BWP ID field is 2 bits for example. Optionally, the MAC-CE includes one or more activated or deactivated information (e.g., field(s) for activation or deactivation). Taking an activation or deactivation field for example, the field is used to indicate an activated or deactivated status of a (periodic and/or semi-persistent and/or aperiodic) CSI report (e.g., CSI report configuration). Optionally, the CSI report may be (one or more) CSI report(s) configured in the CSI report configuration information (e.g., CSI report configuration in csi-ReportConfigToAddModList). Optionally, the CSI report includes periodic CSI reports (e.g., periodic CSI report configuration in csi-ReportConfigToAddModList). Optionally, the CSI report includes semi-persistent CSI reports (e.g., semi-persistent CSI configuration in csi-ReportConfigToAddModList). Optionally, the CSI report includes semi-persistent CSI reports based on PUCCH (e.g., CSI reports using PUCCH resources to carry the CSI; and/or CSI reports with a type set to semiPersistentOnPUCCH). Optionally, the CSI report includes semi-persistent CSI reports based on PUSCH (e.g., CSI reports using PUSCH resources to carry the CSI; and/or CSI reports with a type set to semiPersistentOnPUSCH). Optionally, the CSI report includes periodic CSI reports. Optionally, the CSI report includes aperiodic CSI reports. For example, a first field of the one or more fields indicates the report configuration which includes PUCCH resources for semi-persistent (SP) CSI reporting in the indicated BWP and has the lowest CSI-ReportConfigId within the list with type set to semiPersistentOnPUCCH; a second field indicates the report configuration which includes PUCCH resources for SP CSI reporting in the indicated BWP and has the second lowest CSI-ReportConfigId, and so on. Optionally, if the number of the CSI report configuration based on PUCCH in the CSI report configuration information (in the indicated BWP) is less than i+1, a MAC entity ignores the i-th field. When the i-th field is set to 1, the field indicates that the corresponding semi-persistent CSI report configuration is activated. When the i-th field is set 0, the field indicates that the corresponding semi-persistent CSI report configuration is deactivated.

Optionally, the first information is determined and/or the first parameter is indicated or updated by the first information by the following methods.

(The first information associated with/included in) the MAC-CE indicates or updates the first parameter associated with at least one CSI report (activated by the MAC-CE). Here, the MAC-CE not only can activate or trigger a CSI report but also includes the first information. Here, the first parameter (e.g., power parameter, spatial domain parameter, or frequency-domain parameter) associated with a CSI report triggered or activated by the MAC-CE is indicated or updated by the first information associated with/included in the MAC-CE. For the description of the first information indicating or updating the first parameter, see Embodiment I. Optionally, the first information is indicated by MAC-CE (e.g., a MAC-CE field). Optionally, the first information is indicated by one or more MAC-CE fields. Optionally, a number of the one or more MAC-CE fields is configured or predefined by higher-level signaling (e.g., the number is one of 1, 2, 3, and 4). Optionally, whether the one or more MAC-CE fields for indicating the first information is/are present for a corresponding CSI report is related to whether the CSI report is activated. For example, when an activation/deactivation field indicates activation, the one or more MAC-CE fields associated with the corresponding CSI report (MAC-CE field(s) for indicating the first information) is/are present. For example, when the activation/deactivation field indicates deactivation, the one or more MAC-CE field(s) associated with the corresponding CSI report (MAC-CE field(s) for indicating the first parameter of the CSI report/the first information) is/are not present.

A mapping relationship between one or more MAC-CE fields for indicating the first information and a CSI report triggered/activated by the MAC-CE may be determined by at least one of the following methods.

Method I

The MAC-CE indicates or activates one or more CSI reports, wherein the one or more MAC-CE fields are related to the one or more CSI reports. Optionally, the one or more MAC-CE fields are in one-to-one correspondence with the one or more CSI reports. Optionally, the one or more MAC-CE fields are in one-to-one correspondence with the one or more (activated) CSI reports according to an increasing/decreasing order of the value of CSI report configuration IDs. For example, the MAC-CE includes N MAC-CE fields (for indicating the first parameter/first information) and the MAC-CE triggers/activates N CSI reports (or, the MAC-CE triggers/activates CSI reports with the number as many as the number N of the MAC-CE fields), a first MAC-CE field is associated with a first CSI report (e.g., a CSI report corresponding to a first field for activating or deactivating the CSI report, or a CSI report with the smallest CSI report configuration ID); a second MAC-CE field is associated with a second CSI report (e.g., a CSI report corresponding to a second field for activating or deactivating the CSI report, or a CSI report with the second smallest CSI report configuration ID), and so on. Optionally, the number of the one or more MAC-CE fields is greater than or equal to the number of the one or more CSI reports. Optionally, the first M MAC-CE fields of the one or more MAC-CE fields are used to indicate first parameters of the corresponding CSI reports, wherein M represents the number of the CSI reports triggered/activated by the MAC-CE. For example, the MAC-CE includes N MAC-CE fields (for indicating the first parameter/first information) and the MAC-CE triggers M CSI reports (e.g., M is less than or equal to N), a first MAC-CE field is associated with a first (activated) CSI report (e.g., a CSI report corresponding to a first field for activating or deactivating the CSI report, or a CSI report with the smallest CSI report configuration ID); a second MAC-CE field is associated with a second (activated) CSI report (e.g., a CSI report corresponding to a second field for activating or deactivating the CSI report, or a CSI report with the second smallest CSI report configuration ID), and so on. Optionally, here, reports triggered by the MAC-CE may be (all) aperiodic reports or may be (all) semi-persistent reports. Optionally, the CSI report configuration ID includes a semi-persistent CSI report configuration ID. Optionally, the CSI report configuration ID includes an aperiodic CSI report configuration ID.

Optionally, the MAC-CE field (for indicating the first parameter/first information) may be MAC-CE field(s) for indicating one or more first parameters/first information associated with a CSI report, or a MAC-CE field for indicating one or more first parameters/first information associated with the (activated) CSI report corresponding to the MAC-CE field. Optionally, one MAC-CE field corresponds to/is associated with one first parameter/first information. Optionally, the MAC-CE field may be at least one of the following.

The MAC-CE field is used to indicate at least one of N1, N2, Ng, Ng_subset, and N_offset. For example, the MAC-CE includes one or more fields, and each field indicates at least one of the parameters N1, N2, Ng, Ng_subset, and N_offset (of one CSI report, or one semi-persistent CSI report). For example, one MAC-CE field indicates at least one of the parameters N1, N2, and Ng (of one CSI report, or one semi-persistent CSI report). For example, one MAC-CE field indicates at least one of the parameters Ng_subset and N_offset (of one CSI report, or one semi-persistent CSI report). Optionally, a CSI report refers to the (activated) CSI report corresponding to the MAC-CE field. For the description of N1, N2, Ng, Ng_subset, and N_offset, see Embodiment I.

The MAC-CE field is used to indicate at least one of N1, N2, Ng, Ng_subset, and N_offset. For example, the MAC-CE includes one or more fields, and each field indicates at least one of the parameters N1, N2, Ng, Ng_subset, and N_offset (of one CSI report, or one reference signal associated with one semi-persistent CSI report). For example, one MAC-CE field indicates at least one of the parameters N1, N2, and Ng (of one reference signal associated with one CSI report, or one reference signal associated with one semi-persistent CSI report). For example, one MAC-CE field indicates at least one of the parameters Ng_subset and N_offset (of one reference signal associated with one CSI report, or one reference signal associated with one semi-persistent CSI report). Optionally, a CSI report refers to the (activated) CSI report corresponding to the MAC-CE field. For the description of N1, N2, Ng, Ng_subset, and N_offset, see Embodiment I.

For example, the MAC-CE field is used to indicate a port parameter or port information (of one CSI report, or one semi-persistent CSI report), or the MAC-CE field is used to indicate a port parameter or port information (of the reference signal associated with one CSI report, or the reference signal associated with one semi-persistent CSI report). Optionally, a CSI report refers to the (activated) CSI report corresponding to the MAC-CE field. Here, for the description of the port parameter and the port information, see Embodiment I.

The MAC-CE field is used to indicate a power parameter or power information (of one CSI report, or one semi-persistent CSI report), or the MAC-CE field is used to indicate a power parameter or power information (of the reference signal associated with one CSI report, or the reference signal associated with one semi-persistent CSI report). Optionally, a CSI report refers to the (activated) CSI report corresponding to the MAC-CE field. Here, for the description of the power parameter and the power information, see Embodiment I.

The MAC-CE field is used to indicate the frequency-domain information. For example, one MAC-CE field is used to indicate the frequency-domain information/frequency-domain parameter of an associated/corresponding (activated) CSI report. Here, for the description of the frequency-domain parameter and the frequency-domain information, see Embodiment I.

The MAC-CE field is used to indicate channel quality indicator (CQI) table information. For example, one MAC-CE field is used to indicate the CQI table information of an associated/corresponding (activated) CSI report. Here, for the description of the CQI table information, see Embodiment I.

The MAC-CE field is used to indicate measurement information. For example, one MAC-CE field is used to indicate the measurement information of an associated/corresponding (activated) CSI report. Here, for the description of the measurement information, see Embodiment I.

The MAC-CE field is used to indicate CSI report container information. For example, one MAC-CE field is used to indicate the CSI report container information of an associated/corresponding (activated) CSI report. Here, for the description of the CSI report container information, see Embodiment I.

The MAC-CE field is used to indicate index(es) of configuration information (e.g., one or more first configuration information) associated with/corresponding to the first information. Here, for the description of the configuration information (e.g., the first configuration information) associated with/corresponding to the first information, see Embodiment I.

Optionally, one or more first configuration information may be (all and/or configured) first configuration information of a CSI report. Optionally, (for each CSI report, or for each activated CSI report) the MAC-CE may include MAC-CE field(s) for selecting/indicating the first configuration information. For example, the MAC-CE field(s) is/are used to select/indicate (all or part of) the first configuration information of one CSI report. For example, the MAC-CE field is used to select/indicate (all or part of) the first configuration information corresponding to/associated with the reference signal of one CSI report (or associated with a CSI report). Here, for the description of the first configuration information, see Embodiment I.

Optionally, a CSI report may be the CSI report corresponding to/associated with the MAC-CE field. Optionally, the reference signal associated with a CSI report refers to the reference signal (for channel measurement) indicated/selected by the MAC-CE (or the MAC-CE field) of the CSI report.

This method may indicate/update parameters related to one or more CSI reports, improving the flexibility of the communication system.

Method II

The MAC-CE triggers or activates (one) CSI report and the CSI report is associated with one or more reference signal resources (or a reference signal resource set), wherein the one or more MAC-CE fields are related to one or more reference signal resources associated with the CSI report. Optionally, the one or more MAC-CE fields are in one-to-one correspondence with the one or more reference signal resources. Optionally, the one or more MAC-CE fields are in one-to-one correspondence with the one or more reference signal resources according to an order of magnitudes of reference signal resource IDs (e.g., resource configuration IDs). For example, N MAC-CE fields are configured in the MAC-CE and CSI reports triggered/activated by the MAC-CE are associated with N reference signal resources (or, the MAC-CE triggers/activates the reference signal resources as many as the number N of the MAC-CE fields), a first MAC-CE field is associated with a first reference signal resource (e.g., a reference signal resource with the smallest reference signal resource ID; for another example, a first reference signal resource in a reference signal resource set); a second MAC-CE field is associated with a second reference signal resource (e.g., a reference signal resource with the second smallest reference signal resource ID; for another example, a second reference signal resource in the reference signal resource set), and so on. Optionally, the number of the one or more MAC-CE fields is greater than or equal to the number of the one or more reference signal resources. Optionally, the first P MAC-CE fields of the one or more MAC-CE fields are used to indicate first parameters of P reference signal resources for the corresponding CSI reports, wherein P represents the number of the reference signal resources for the CSI reports triggered/activated by the MAC-CE. For example, N MAC-CE fields are configured in the MAC-CE and the MAC-CE triggers/activates CSI reports associated with P reference signal resources (e.g., P is less than or equal to N), a first MAC-CE field is associated with a first reference signal resource (e.g., a CSI report with the smallest reference signal resource ID; for another example, a first reference signal resource in a reference signal resource set); a second MAC-CE field is associated with a second reference signal resource (e.g., a CSI report with a second smallest reference signal resource ID; for another example, a second reference signal resource in the reference signal resource set), and so on. Optionally, here, reports triggered by the DCI may be (all) aperiodic reports or may be (all) semi-persistent reports. Optionally, the CSI report configuration ID includes a semi-persistent CSI report configuration ID. Optionally, the CSI report configuration ID includes an aperiodic CSI report configuration ID.

Optionally, the reference signal associated with a CSI report refers to (all) the reference signal(s) (e.g., a reference signal for channel measurement) for the CSI report. Optionally, (for each CSI report, or for each activated CSI report) the MAC-CE may include one MAC-CE field for selecting/indicating the reference signal. For example, the MAC-CE field is used to select/indicate (part of or all of) reference signals in a reference signal set (for the channel measurements) for one CSI report. Optionally, a CSI report may be the CSI report corresponding to/associated with the MAC-CE field. Optionally, the reference signal associated with a CSI report refers to the reference signal (for channel measurement) indicated/selected by the MAC-CE (or the MAC-CE field) of the CSI report.

Optionally, one or more first configuration information may be (all and/or configured) first configuration information of a CSI report. Optionally, (for each CSI report, or for each activated CSI report) the MAC-CE may include one MAC-CE field for selecting/indicating the first configuration information. For example, the MAC-CE field is used to select/indicate (all or part of) the first configuration information of one CSI report. For example, the MAC-CE field is used to select/indicate (all or part of) the first configuration information corresponding to/associated with the reference signal of one CSI report (or associated with a CSI report). Here, for the description of the first configuration information, see Embodiment I. Optionally, a CSI report may be the CSI report corresponding to/associated with the MAC-CE field. Optionally, the reference signal associated with a CSI report refers to the reference signal (for channel measurement) indicated/selected by the MAC-CE (or the MAC-CE field) of the CSI report.

Optionally, the MAC-CE field (for indicating the first parameter/first information) may be a MAC-CE field for indicating one or more first parameters/first information of one (or each) reference signal associated with a CSI report, or a MAC-CE field for indicating one or more first parameters/first information of one (or each) reference signal associated with the (activated) CSI report corresponding to the MAC-CE field. Optionally, one MAC-CE field corresponds to/is associated with one first parameter/first information. Optionally, the MAC-CE field may be at least one of the following.

The MAC-CE field is used to indicate at least one of N1, N2, Ng, Ng_subset, and N_offset. For example, the MAC-CE includes one or more fields, and each field indicates at least one of the parameters N1, N2, Ng, Ng_subset, and N_offset. For example, one MAC-CE field indicates at least one of the parameters N1, N2, and Ng. For example, one MAC-CE field indicates at least one of the parameters Ng_subset and N_offset. For the description of N1, N2, Ng, Ng_subset, and N_offset, see Embodiment I.

The MAC-CE field is used to indicate a port parameter or port information. For example, one MAC-CE field (is used to) indicates the port parameter or port information. Here, for the description of the port parameter and the port information, see Embodiment I.

The MAC-CE field is used to indicate a power parameter or power information. For example, one MAC-CE field (is used to) indicates the power parameter or power information. Here, for the description of the power parameter and the power information, see Embodiment I.

The MAC-CE field is used to indicate frequency-domain information/frequency-domain parameter. For example, one MAC-CE field indicates (is used for) the frequency-domain information/frequency-domain parameter. Here, for the description of the frequency-domain parameter and the frequency-domain information, see Embodiment I.

The MAC-CE field is used to indicate channel quality indicator (CQI) table information. For example, one MAC-CE field (is used to) indicates channel quality indicator (CQI) table information. Here, for the description of the CQI table information, see Embodiment I.

The MAC-CE field is used to indicate measurement information. For example, one MAC-CE field (is used to) indicates measurement information. Here, for the description of the measurement information, see Embodiment I.

The MAC-CE field is used to indicate CSI report container information. For example, one MAC-CE field (is used to) indicates CSI report container information. Here, for the description of the CSI report container information, see Embodiment I.

The MAC-CE field is used to indicate index(es) of configuration information (e.g., one or more first configuration information) associated with/corresponding to the first information. For example, one MAC-CE field (is used to) indicates index(es) of configuration information (e.g., one or more first configuration information) associated with/corresponding to the first information. Here, for the description of the configuration information (e.g., the first configuration information) associated with/corresponding to the first information, see Embodiment I.

This method may indicate/update parameters related to different reference signals for one or more CSI reports, improving the flexibility of the communication system.

Method III

The MAC-CE triggers or activates one or more CSI reports and each CSI report is associated with one or more reference signal resources, wherein the one or more MAC-CE fields are in one-to-one correspondence with one or more reference signal resources associated with the one or more CSI reports. This method is a combination of the above-described Method I and Method II for determining the mapping relationship between one or more MAC-CE fields for indicating the first information and the CSI reports triggered/activated by the MAC-CE. Optionally, the first P MAC-CE fields of the one or more MAC-CE fields are associated with a first CSI report (e.g., a CSI report corresponding to a first field for activating or deactivating the CSI report, or a CSI report with the smallest CSI report configuration ID), and the association method is as shown in Method II. Optionally, P+1 to 2P MAC-CE fields of the one or more MAC-CE fields are associated with a second CSI report (e.g., a CSI report corresponding to a second field for activating or deactivating the CSI report, or a CSI report with the second smallest CSI report configuration ID), and so on. Optionally, here, reports triggered or activated by the DCI may be (all) aperiodic reports or may be (all) semi-persistent reports. Optionally, the CSI report configuration ID includes a semi-persistent CSI report configuration ID. Optionally, the CSI report configuration ID includes an aperiodic CSI report configuration ID.

Optionally, the reference signal associated with a CSI report refers to (all) the reference signal(s) for channel measurement(s) for the CSI report. Optionally, (for each CSI report, or for each activated CSI report) the MAC-CE may include one MAC-CE field for selecting/indicating the reference signal. For example, the MAC-CE field is used to select/indicate (part of or all of) reference signals in a reference signal set (for the channel measurements) for one CSI report. Optionally, a CSI report may be the CSI report corresponding to/associated with the MAC-CE field. Optionally, the reference signal associated with a CSI report refers to the reference signal (for channel measurement) indicated/selected by the MAC-CE (or the MAC-CE field) of the CSI report.

Optionally, the MAC-CE field (for indicating the first parameter/first information) may be a MAC-CE field for indicating one or more first parameters/first information of one (or each) reference signal associated with a CSI report, or a MAC-CE field for indicating one or more first parameters/first information of one (or each) reference signal associated with the (activated) CSI report corresponding to the MAC-CE field. Optionally, one MAC-CE field corresponds to/is associated with one first parameter/first information. Optionally, the MAC-CE field may be at least one of the following.

The MAC-CE field is used to indicate at least one of N1, N2, Ng, Ng_subset, and N_offset. For example, the MAC-CE includes one or more fields, and each field indicates at least one of the parameters N1, N2, Ng, Ng_subset, and N_offset. For example, one MAC-CE field indicates at least one of the parameters N1, N2, and Ng. For example, one MAC-CE field indicates at least one of the parameters Ng_subset and N_offset. For the description of N1, N2, Ng, Ng_subset, and N_offset, see Embodiment I.

The MAC-CE field is used to indicate a port parameter or port information. For example, one MAC-CE field (is used to) indicates the port parameter or port information. Here, for the description of the port parameter and the port information, see Embodiment I.

The MAC-CE field is used to indicate a power parameter or power information. For example, one MAC-CE field (is used to) indicates the power parameter or power information. Here, for the description of the power parameter and the power information, see Embodiment I.

The MAC-CE field is used to indicate frequency-domain information/frequency-domain parameter. For example, one MAC-CE field indicates (is used for) the frequency-domain information/frequency-domain parameter. Here, for the description of the frequency-domain parameter and the frequency-domain information, see Embodiment I.

The MAC-CE field is used to indicate channel quality indicator (CQI) table information. For example, one MAC-CE field (is used to) indicates channel quality indicator (CQI) table information. Here, for the description of the CQI table information, see Embodiment I.

The MAC-CE field is used to indicate measurement information. For example, one MAC-CE field (is used to) indicates measurement information. Here, for the description of the measurement information, see Embodiment I.

The MAC-CE field is used to indicate CSI report container information. For example, one MAC-CE field (is used to) indicates CSI report container information. Here, for the description of the CSI report container information, see Embodiment I.

The MAC-CE field is used to indicate index(es) of configuration information (e.g., one or more first configuration information) associated with/corresponding to the first information. For example, one MAC-CE field (is used to) indicates index(es) of configuration information (e.g., one or more first configuration information) associated with/corresponding to the first information. Here, for the description of the configuration information (e.g., the first configuration information) associated with/corresponding to the first information, see Embodiment I.

This method may indicate/update parameters related to different reference signals for one or more CSI reports, improving the flexibility of the communication system.

Optionally, after the UE receives the MAC-CE (e.g., MAC-CE for activation) (Optionally, and when the UE transmits PUCCH with HARQ-ACK information in a slot n corresponding to PDSCH carrying an activation command, starting from a first slot after slot $$n+3N_{slot}^{subframe,\mu}$$

(Optionally, the SCS of the first slot is determined according to the SCS of a time resource indicated by the MAC-CE)), the UE applies/uses the indication (e.g., the first information) of the MAC-CE. Optionally, μ is SCS configuration of PUCCH.

Optionally, after the UE receives the MAC-CE (e.g., MAC-CE for deactivation) (Optionally, and when the UE transmits PUCCH with HARQ-ACK information in a slot n corresponding to PDSCH carrying an activation command, starting from a first slot after slot $$n+3N_{slot}^{subframe,\mu}$$

(here, $$N_{slot}^{subframe,\mu}$$

is a number of slot slots per subframe for SCS configuration μ of the PUCCH transmission) (μ is the SCS configuration of PUCCH) (Optionally, the SCS of the first slot is determined according to the SCS of a time resource indicated by the MAC-CE)), the UE stops applying/using the indication (e.g., the first information) of the MAC-CE. Optionally, μ is the SCS configuration of the PUCCH.

The advantage of this method is that the base station may adjust/indicate the parameter associated with the (activated) CSI report by the information carried in the MAC-CE while triggering/activating the CSI report, thereby improving the system flexibility.

Embodiment III

Figure 4C:
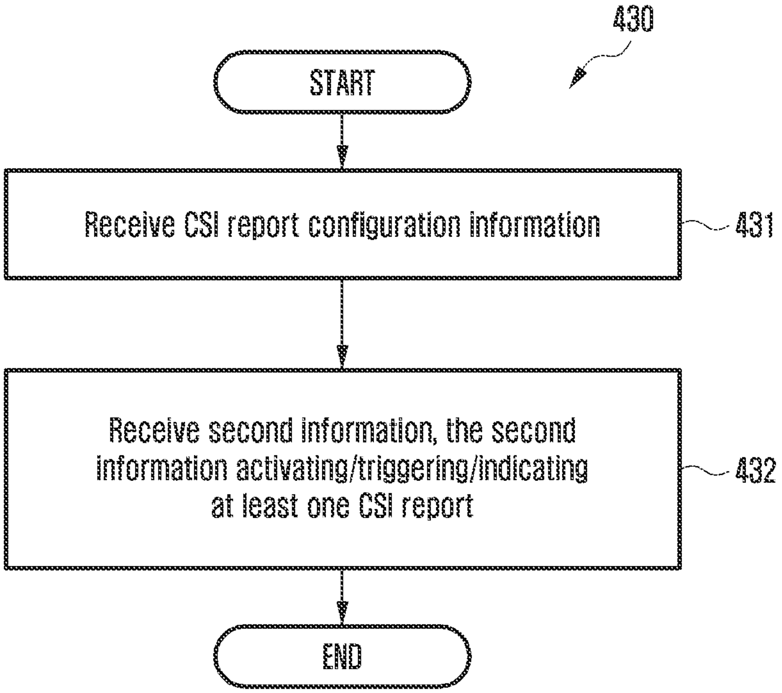
FIG. 4C illustrates a method performed by a UE according to various embodiments of the disclosure.

FIG. 4C illustrates a method 430 performed by a UE according to an embodiment of the disclosure. Optionally, first information is determined. Optionally, based on a first parameter associated with a CSI report, a CSI parameter is determined or at least one first CSI report is reported. Optionally, the first parameter is based on the first information.

The method 430 includes that: optionally, the UE receives CSI report configuration information at 431. Optionally, the CSI report configuration information may be report configuration list information. Optionally, the report configuration information is used for configuring a CSI report (or CSI report setting). For example, the CSI report configuration information includes csi-ReportConfigToAddModList and/or csi-ReportConfigToReleaseList.

Optionally, the UE receives second information at 432. Optionally, the UE receives the second information. Optionally, the second information activates/triggers/indicates at least one CSI report (in the CSI report configuration information). Optionally, the second information activates/triggers/indicates at least one periodic (and/or semi-persistent) CSI report (in the CSI report configuration information). Optionally, the second information is carried by a DCI or MAC-CE. The second information indicates at least one CSI report by at least one of the following methods.

Method I

The second information indicates at least one CSI report by a bitmap (e.g., one or more bits, or one or more fields). Optionally, the bitmap is associated with CSI reports according to magnitudes of CSI report configuration IDs or positions in the CSI report configuration information. For example, a first bit of the bitmap corresponds to a CSI report with the smallest ID or the first CSI report in the CSI report (list) configuration information. For example, the first bit of the bitmap corresponds to a CSI report with the smallest ID or the first CSI report among periodic/semi-persistent/aperiodic reports in the CSI report configuration (list) information. For example, a second bit of the bitmap corresponds to a CSI report with the second smallest ID or the second CSI report in the CSI report configuration information. For example, when a corresponding bit in the bitmap is 1, the corresponding CSI report is indicated. For example, when the corresponding bit in the bitmap is 0, the corresponding CSI report no is not indicated/triggered/activated. Optionally, a length of the bitmap (or a length of a field corresponding to the bitmap) may be configured or predefined by higher-level signaling (e.g., one of 4, 5, and 6).

Method II

The second information indicates/is associated with one or more information (or, one or more fields) indicating at least one CSI report. Optionally, one or each of the one or more fields indicates one CSI report ID. For example, the second information includes (a non-zero codepoint) of one field or each field of a plurality of fields indicating one CSI report ID. For example, (a non-zero codepoint) of (one or more) field(s) indicates one CSI report ID. For example, (a zero codepoint) of (one or more) field(s) indicates that no CSI (or report) is requested/indicated/triggered. Optionally, a size of (each) field is configured or predefined by higher-level signaling (e.g., 6 bits). Optionally, a number of fields is configured or predefined by higher-level signaling (e.g., one of 4, 5, and 6).

Method III

The second information indicates/is associated with one information (or, one field) indicating at least one CSI report. Optionally, the field indicates a combination of CSI reports (e.g., CSI report IDs). Optionally, the UE receives higher-level signaling, wherein the higher-level signaling includes a combination of one or more CSI reports. Optionally, the UE may receive MAC-CE signaling for indicating/selecting a subset of one or more CSI report combinations included in higher-level signaling. Optionally, a codepoint of the field is related to one or more CSI report combinations included in higher-level signaling. For example, (non-zero) codepoints of the field are related to/mapped one to one to the one or more CSI report combinations included in higher-level signaling (e.g., mapped one to one according to a sequential order or an order, by size, of the one or more CSI report ID combinations in higher-level signaling). For example, a zero codepoint of the field indicates that no CSI is requested/indicated/triggered. Optionally, the codepoints of the field are related to a subset indicated/selected by the MAC-CE. For example, (non-zero) codepoints of the field are related to/mapped one to one to a subset indicated/selected by MAC-CE signaling (e.g., mapped one to one according to a sequential order or an order, by size, of the one or more CSI report combinations indicated/selected by MAC-CE signaling). For example, a zero codepoint of the field indicates that no CSI (or report) is requested/indicated/triggered.

Optionally, the first information is determined and/or the first parameter is indicated or updated by the first information by the following methods. The first information indicates or updates the first parameter associated with at least one CSI report (indicated by the second information). Here, the first parameter (e.g., power parameter, spatial domain parameter, or frequency-domain parameter) associated with a CSI report triggered or activated by the second information may be indicated or updated by the first information. For the description of the first information indicating or updating the first parameter, see Embodiment I. Optionally, the first information is related to the second information. Optionally, the first information and the second information are associated based on RRC signaling. For example, when the UE receives the first information, the second information may be determined by an association (relationship) between the first information and the second information configured by RRC information. Optionally, the first information and the second information are encoded separately. Optionally, the first information and the second information are encoded jointly. Optionally, the first information and/or the second information are carried by (same) signaling (e.g., MAC-CE or DCI).

Optionally, the first information is indicated by MAC-CE or DCI. Optionally, the first information is indicated by one or more fields (e.g., MAC-CE fields or DCI fields). Optionally, a number of the one or more fields is configured or predefined by higher-level signaling (e.g., the number is one of 1, 2, 3, and 4). For example, both of the first information and the second information are carried by MAC-CE signaling. Optionally, the MAC-CE is used to indicate that whether one or more fields of the first information exist is related to whether a CSI report is activated. For example, when the activation/deactivation field indicates activation, the one or more MAC-CE fields (MAC-CE fields for indicating the first parameter of the CSI report/the first information) exist(s). For example, when the activation/deactivation field indicates deactivation, the one or more MAC-CE fields (MAC-CE fields for indicating the first parameter of the CSI report/the first information) does/do not exist.

For example, both of the first information and the second information are carried by MAC-CE signaling. A mapping relationship between one or more (MAC-CE) fields for indicating the first information and a CSI report indicated/triggered/activated by the second information may be determined by at least one of the following methods.

Method I

The (second information included in) MAC-CE indicates or activates or triggers one or more CSI reports. Optionally, one or more fields in the MAC-CE are related to one or more CSI reports. Optionally, the one or more MAC-CE fields are in one-to-one correspondence with the one or more CSI reports. Optionally, the one or more MAC-CE fields are in one-to-one correspondence with the one or more (indicated/activated) CSI reports according to an order of magnitudes of CSI report configuration IDs. For example, the MAC-CE includes N MAC-CE fields (for indicating the first information) and the DCI indicates/triggers/activates N CSI reports (or, the MAC-CE indicates/triggers/activates CSI reports as many as the number N of the MAC-CE fields), a first MAC-CE field is associated with a first (indicated) CSI report (e.g., a first CSI report corresponding to an (indicated) bitmap, or a first CSI report in an (indicated) CSI report combination, or a CSI report with the smallest (indicated) CSI report configuration ID); a second MAC-CE field is associated with a second (indicated) CSI report (e.g., a second CSI report corresponding to an (indicated) bitmap, or a second CSI report in an (indicated) CSI report combination, or a CSI report with the second smallest (indicated) CSI report configuration ID), and so on. Optionally, the number of the one or more MAC-CE fields is greater than or equal to the number of the one or more CSI reports. Optionally, the first M MAC-CE fields of the one or more MAC-CE fields are used to indicate first parameters of the corresponding CSI reports, wherein M represents the number of the CSI reports indicated/triggered/activated by the MAC-CE. For example, the MAC-CE includes N MAC-CE fields (for indicating the first information) and the MAC-CE triggers M CSI reports (e.g., M is less than or equal to N), a first MAC-CE field is associated with a first (indicated) CSI report (e.g., a first CSI report corresponding to an (indicated) bitmap, or a first CSI report in an (indicated) CSI report combination, or a CSI report with the smallest (indicated) CSI report configuration ID); a second MAC-CE field is associated with a second (indicated) CSI report (e.g., a second CSI report corresponding to an (indicated) bitmap, or a second CSI report in an (indicated) CSI report combination, or a CSI report with the second smallest (indicated) CSI report configuration ID), and so on. Optionally, the MAC-CE ignores (indications of) another N-M fields. Optionally, reports indicated/triggered/activated by the MAC-CE may be (all) aperiodic reports, or may be (all) semi-persistent reports, or may be (all) periodic reports. Optionally, the CSI report configuration ID includes a semi-persistent CSI report configuration ID. Optionally, the CSI report configuration ID includes an aperiodic CSI report configuration ID. Optionally, the CSI report configuration ID includes a periodic CSI report configuration ID.

Method II

The (second information included in) MAC-CE indicates or activates or triggers (one) CSI report and the CSI report is associated with one or more reference signal resources (or a reference signal resource set). Optionally, one or more fields in the MAC-CE are related to one or more reference signal resources (or reference signal resource sets) associated with a CSI report. Optionally, the one or more MAC-CE fields are in one-to-one correspondence with the one or more reference signal resources. Optionally, the one or more DCI fields are in one-to-one correspondence with the one or more reference signal resources according to an order of magnitudes of reference signal resource IDs (e.g., resource configuration IDs). For example, N MAC-CE fields are configured in the MAC-CE and CSI reports indicated/triggered/activated by the MAC-CE are associated with N reference signal resources (or, the MAC-CE triggers/activates the reference signal resources as many as the number N of the MAC-CE fields), a first MAC-CE field is associated with a first reference signal resource (e.g., a reference signal resource with the smallest reference signal resource ID; for another example, a first reference signal resource in a reference signal resource set); a second MAC-CE field is associated with a second reference signal resource (e.g., a reference signal resource with the second smallest reference signal resource ID; for another example, a second reference signal resource in the reference signal resource set), and so on. Optionally, the number of the one or more MAC-CE fields is greater than or equal to the number of the one or more reference signal resources. Optionally, the first P MAC-CE fields of the one or more MAC-CE fields are used to indicate first parameters of P reference signal resources for the corresponding CSI reports, wherein P represents the number of the reference signal resources for the CSI reports indicated/triggered/activated by the MAC-CE. For example, the MAC-CE includes N MAC-CE fields and the MAC-CE indicates/triggers/activates CSI reports associated with P reference signal resources (e.g., P is less than or equal to N), a first MAC-CE field is associated with a first reference signal resource (e.g., a CSI report with the smallest reference signal resource ID; for another example, a first reference signal resource in a reference signal resource set); a second MAC-CE field is associated with a second reference signal resource (e.g., a CSI report with a second smallest reference signal resource ID; for another example, a second reference signal resource in the reference signal resource set), and so on. Optionally, the MAC-CE ignores (indications of) another N-M fields. Optionally, reports indicated/triggered/activated by the MAC-CE may be (all) aperiodic reports, or may be (all) semi-persistent reports, or may be (all) periodic reports. Optionally, the CSI report configuration ID includes a semi-persistent CSI report configuration ID. Optionally, the CSI report configuration ID includes an aperiodic CSI report configuration ID. Optionally, the CSI report configuration ID includes a periodic CSI report configuration ID.

Method III

The (second information included in) MAC-CE indicates or activates or triggers one or more CSI reports and each CSI report is associated with one or more reference signal resources. Optionally, the MAC-CE includes one or more fields, wherein the one or more MAC-CE fields are in one-to-one correspondence with one or more reference signal resources associated with the one or more CSI reports. This method is a combination of the above-described Method I and Method II for determining the mapping relationship between one or more MAC-CE fields for indicating the first information and the CSI reports indicated/triggered/activated by the second information. Optionally, the first P MAC-CE fields of the one or more MAC-CE fields are associated with a first (indicated) CSI report (e.g., a first CSI report corresponding to an (indicated) bitmap, or a first CSI report in an (indicated) CSI report combination, or associated with one or more reference signal resources associated with a CSI report with the smallest (indicated) CSI report configuration ID), and the association method is as shown in Method II. Optionally, P+1 to 2P MAC-CE fields of the one or more MAC-CE fields are associated with a second (indicated) CSI report (e.g., a second CSI report corresponding to an (indicated) bitmap, or a second CSI report in an (indicated) CSI report combination, or a CSI report with the second smallest (indicated) CSI report configuration ID), and so on. Optionally, reports indicated/triggered/activated by the MAC-CE may be (all) aperiodic reports, or may be (all) semi-persistent reports, or may be (all) periodic reports. Optionally, the CSI report configuration ID includes a semi-persistent CSI report configuration ID. Optionally, the CSI report configuration ID includes an aperiodic CSI report configuration ID. Optionally, the CSI report configuration ID includes a periodic CSI report configuration ID.

Optionally, after the UE receives the MAC-CE (e.g., MAC-CE for activation) (Optionally, and when the UE transmits PUCCH with HARQ-ACK information in a slot n corresponding to PDSCH carrying an activation command, starting from a first slot after slot $$n + 3N_{slot}^{subframe,\mu}$$

(Optionally, the SCS of the first slot is determined according to the SCS of a time resource indicated by the MAC-CE)), the UE applies/uses the indication (e.g., the first information and/or the second information) of the MAC-CE. Optionally, μ is the SCS configuration of the PUCCH.

Optionally, after the UE receives the MAC-CE (e.g., MAC-CE for deactivation) (Optionally, and when the UE transmits PUCCH with HARQ-ACK information in a slot n corresponding to PDSCH carrying an activation command, starting from a first slot after slot $$n + 3N_{slot}^{subframe,\mu}$$

(here, $$N_{slot}^{subframe,\mu}$$

is a number of slots per subframe for SCS configuration u of the PUCCH transmission) (μ is the SCS configuration of PUCCH) (Optionally, the SCS of the first slot is determined according to the SCS of a time resource indicated by the MAC-CE)), the UE stops applying/using the indication (e.g., the first information and/or the second information) of the MAC-CE. Optionally, μ is the SCS configuration of the PUCCH. The advantage of this method is that the base station dynamically indicates or updates the parameter of a CSI report so as to flexibly obtain a corresponding CSI feedback, improving the system flexibility.

Embodiment IV

Figure 4D:
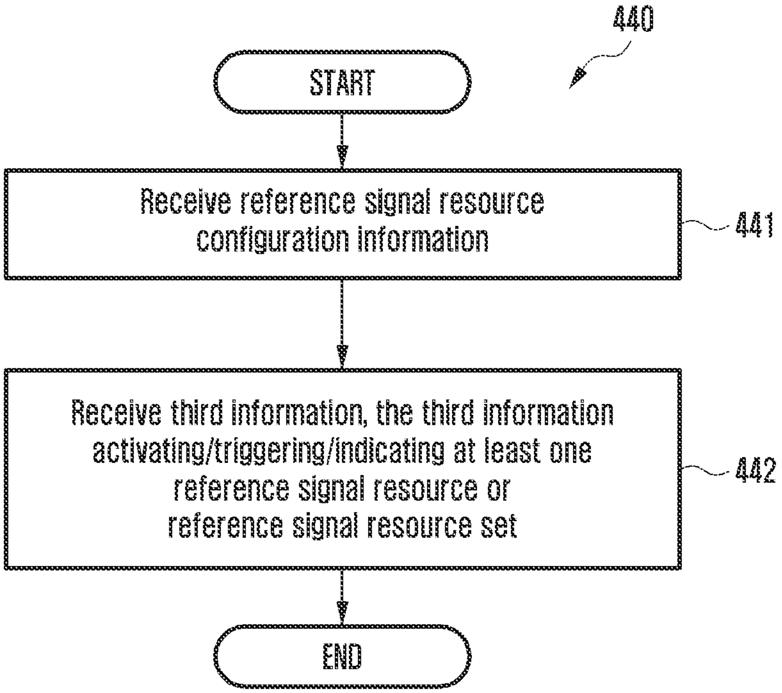
FIG. 4D illustrates a method performed by a UE according to various embodiments of the disclosure.

FIG. 4D illustrates a method 440 performed by a UE according to an embodiment of the disclosure. Optionally, the UE determines fourth information. Optionally, the UE applies/uses/determines a second parameter associated with at least one first reference signal resource. Optionally, the UE determines a CSI parameter (e.g., at least one of CRI, PMI, RI, CQI, and LI) based on the second parameter. Optionally, the UE measures the at least one first reference signal resource based on the second parameter.

The method 440 includes that: optionally, the UE receives reference signal resource configuration information at 441. Here, the reference signal is CSI-RS or SSB for example. Optionally, the reference signal resource configuration information includes reference signal resource configuration information. For example, the reference signal resource configuration information includes nzp-CSI-RS-ResourceToAddModList and/or nzp-CSI-RS-ResourceToReleaseList. Optionally, the reference signal resource configuration information includes reference signal resource set configuration information. For example, the reference signal resource set configuration information includes nzp-CSI-RS-ResourceSetToAddModList and/or nzp-CSI-RS-ResourceSetToReleaseList. Optionally, the reference signal resource configuration information includes reference signal resource configuration information for interference measurement, e.g., csi-IM-ResourceToAddModList and/or csi-IM-ResourceToReleaseList. Optionally, the reference signal resource configuration information includes reference signal resource set configuration information for interference measurement, e.g., csi-IM-ResourceSetToAddModList and/or csi-IM-ResourceSetToReleaseList. The reference signal corresponding to the reference signal resource is CSI-RS or CSI-IM for example.

Optionally, the UE receives third information at 442. Optionally, the third information activates/triggers/indicates at least one reference signal resource or reference signal resource set (in reference signal resource (set) configuration information). Optionally, the third information activates/triggers/indicates at least one (periodic/semi-persistent/aperiodic) reference signal resource (or reference signal resource set) (in reference signal configuration information). Optionally, the third information is carried by a DCI or MAC-CE. The third information indicates at least one reference signal resource (or reference signal resource set) by at least one of the following methods.

Method I

The third information indicates at least one reference signal resource (or reference signal resource set) by a bitmap (e.g., one or more bits, or one or more fields). Optionally, the bitmap is associated with reference signal resources according to magnitudes of reference signal resource IDs or positions of the reference signal resources in reference signal resource configuration information. For example, a first bit of the bitmap corresponds to a reference signal resource with the smallest ID or the first reference signal resource in reference signal configuration information. For example, the first bit of the bitmap corresponds to a CSI report with the smallest ID or the first CSI report in periodic/semi-persistent/aperiodic reference signal resources in the reference signal configuration information. For example, a second bit of the bitmap corresponds to a CSI report with the second smallest ID or the second CSI report in the periodic/semi-persistent/aperiodic reference signal resources in the reference signal configuration information, and so on. For example, when a corresponding bit in the bitmap is 1, the corresponding reference signal resource is indicated. For example, when the corresponding bit in the bitmap is 0, the corresponding reference signal resource is not indicated/triggered/activated. Optionally, a length of the bitmap (or a length of a field corresponding to the bitmap) may be configured or predefined by higher-level signaling (e.g., one of 4, 5, and 6).

Method II

The third information indicates/is associated with one or more information (or, one or more fields) indicating at least one reference signal resource. Optionally, one or each of the one or more fields indicates one reference signal resource ID. For example, the second information includes (a non-zero codepoint) of one field or each field of a plurality of fields indicating one reference signal resource ID. For example, (a non-zero codepoint) of (one or more) field(s) indicates one reference signal resource ID. For example, (a zero codepoint) of (one or more) field(s) indicates that no reference signal resource is requested/indicated/triggered. Optionally, a size of (each) field is configured or predefined by higher-level signaling (e.g., 6 bits). Optionally, a number of fields is configured or predefined by higher-level signaling (e.g., one of 4, 5, and 6).

Method III

The third information indicates/is associated with one information (or, one field) indicating at least one reference signal resource. Optionally, the field indicates a combination of reference signal resources (e.g., reference signal resource IDs or reference signal resource set IDs). Optionally, the UE receives higher-level signaling, wherein the higher-level signaling includes a combination of one or more reference signal resources (sets). Optionally, the UE may receive MAC-CE signaling for indicating/selecting a subset of combinations of one or more reference signal resources (sets) included in higher-level signaling. Optionally, a codepoint of the field is related to a combination of one or more reference signal resources (sets) included in higher-level signaling. For example, (non-zero) codepoints of the field are related to/mapped one to one to the combinations of one or more reference signal resources (sets) included in higher-level signaling (e.g., mapped one to one according to a sequential order of combinations of one or more reference signal resources (sets) in higher-level signaling or an order by size of ID). For example, a zero codepoint of the field indicates that no CSI is requested/indicated/triggered. Optionally, the codepoints of the field are related to a subset indicated/selected by the MAC-CE. For example, (non-zero) codepoints of the field are related to/mapped one to one to a subset indicated/selected by MAC-CE signaling (e.g., mapped one to one according to a sequential order of combinations of one or more reference signal resources (sets) indicated/selected by MAC-CE signaling or an order by size of ID). For example, a zero codepoint of the field indicates that no reference signal resource (set) is requested/indicated/triggered.

Optionally, the UE determines the fourth information.

Optionally, the UE applies/uses/determines a second parameter associated with at least one first reference signal resource. Optionally, the UE determines a CSI parameter (e.g., at least one of CRI, PMI, RI, CQI, and LI) based on the second parameter. Optionally, the UE measures the at least one first reference signal resource based on the second parameter. Optionally, the second parameter is based on the fourth information. The fourth information indicates or updates the second parameter associated with at least one reference signal resource (reference signal resource set) (indicated by the third information). Here, the second parameter (e.g., power parameter or spatial domain parameter or frequency-domain parameter) associated with a reference signal resource indicated or triggered or activated by the third information may be indicated or updated by the fourth information. For the description of the second parameter (associated with the reference signal resource) indicated or updated by the fourth information, see the description of the first parameter (associated with the reference signal resource in association with a CSI report) indicated or updated by the first information in Embodiment I. Optionally, the fourth information is related to the third information. Optionally, the fourth information and the third information are associated based on RRC signaling. For example, when the UE receives the first information, the third information may be determined by an association (relationship) between the fourth information and the third information configured by RRC information. Optionally, the fourth information and the third information are encoded separately. Optionally, the fourth information and the third information are encoded jointly. Optionally, the fourth information and the third information are carried by same signaling (e.g., MAC-CE or DCI).

Optionally, the UE receives signaling (e.g., DCI signaling or MAC-CE signaling); and the signaling is associated with the fourth information. Optionally, the fourth information is indicated by MAC-CE or DCI. Optionally, the fourth information is indicated by one or more fields (e.g., MAC-CE fields or DCI fields). Optionally, a number of the one or more fields is configured or predefined by higher-level signaling (e.g., the number is one of 1, 2, 3, and 4). For example, both of the fourth information and the third information are carried by MAC-CE signaling. Optionally, the MAC-CE is used to indicate that whether one or more fields of the fourth information exist is related to whether a reference signal resource is activated. For example, when the activation/deactivation field indicates activation, the one or more MAC-CE fields (MAC-CE fields for indicating the first parameter of the reference signal resource/the first information) exist(s). For example, when the activation/deactivation field indicates deactivation, the one or more MAC-CE fields (MAC-CE fields for indicating the second parameter of the reference signal resource/the fourth information) does/do not exist.

For example, both of the fourth information and the third information are carried by MAC-CE signaling. A mapping relationship between one or more (MAC-CE) fields for indicating the first information and a reference signal resource (or reference signal resource set) indicated by the third information may be determined by at least one of the following methods.

Method I

The (third information included in) MAC-CE indicates or activates or triggers one or more reference signal resources (sets), wherein the one or more DCI fields are related to the one or more reference signal resources (sets). Optionally, the one or more MAC-CE fields are in one-to-one correspondence with the one or more reference signal resources. Optionally, the one or more MAC-CE fields are in one-to-one correspondence with the one or more (indicated/activated/triggered) reference signal resources according to an order of magnitudes of reference signal resource (set) IDs. For example, the MAC-CE includes N MAC-CE fields (for indicating the first information) and the DCI indicates/triggers/activates N reference signal resources (sets) (or, the MAC-CE indicates/triggers/activates reference signal resources (sets) as many as the number N of the MAC-CE fields), a first MAC-CE field is associated with a first (indicated) reference signal resource (set) (e.g., a first reference signal resource (set) corresponding to an (indicated) bitmap, or a first reference signal resource (set) in an indicated CSI report combination, or a reference signal resource (set) with the smallest (indicated) CSI report configuration ID); a second MAC-CE field is associated with a second reference signal resource (set) (e.g., a second reference signal resource (set) corresponding to an (indicated) bitmap, or a second reference signal resource (set) in an indicated CSI report combination, or a reference signal resource (set) with the second smallest (indicated) CSI report configuration ID), and so on. Optionally, the number of the one or more MAC-CE fields is greater than or equal to the number of the one or more reference signal resources (sets). Optionally, the first M MAC-CE fields of the one or more MAC-CE fields are used to indicate first parameters of corresponding reference signal resources, wherein M represents the number of the reference signal resources (sets) indicated/triggered/activated by the MAC-CE. For example, the MAC-CE includes N MAC-CE fields (for indicating the first information) and the MAC-CE triggers M CSI reports (e.g., M is less than or equal to N), a first MAC-CE field is associated with a first (indicated) reference signal resource (set) (e.g., a first reference signal resource (set) corresponding to an (indicated) bitmap, or a first reference signal resource (set) in an (indicated) CSI report combination, or a reference signal resource (set) with the smallest (indicated) reference signal resource (set) configuration ID); a second MAC-CE field is associated with a second (indicated) reference signal resource (set) (e.g., a second reference signal resource (set) corresponding to an (indicated) bitmap, or a second reference signal resource (set) in an indicated CSI report combination, or a reference signal resource (set) with the second smallest (indicated) reference signal resource configuration ID), and so on. Optionally, reference signal resources (sets) indicated/triggered/activated by the MAC-CE may be (all) aperiodic reference signal resources (sets), or may be (all) semi-persistent reference signal resources (sets), or may be (all) periodic reference signal resources (sets). Optionally, the reference signal resource (set) configuration IDs include semi-persistent reference signal resource (set) configuration IDs. Optionally, the reference signal resource (set) configuration IDs include aperiodic reference signal resource (set) configuration IDs. Optionally, the reference signal resource (set) configuration IDs include periodic reference signal resource (set) configuration IDs.

Method II

The MAC-CE indicates or triggers or activates (one) reference signal resource set and the reference signal resource set is associated with one or more reference signal resources. Optionally, the MAC-CE includes one or more fields. Optionally, the one or more MAC-CE fields are related to the one or more reference signal resources associated with the reference signal resource set. Optionally, the one or more MAC-CE fields are in one-to-one correspondence with the one or more reference signal resources. Optionally, the one or more fields are in one-to-one correspondence with the one or more reference signal resources according to an order of magnitudes of reference signal resource IDs (e.g., resource configuration IDs) or according to a (sequential) order of the reference signal resources in the reference signal resource set. For example, N MAC-CE fields are configured in the MAC-CE and the reference signal resource set indicated/triggered/activated by the MAC-CE is associated with N reference signal resources (or, the MAC-CE indicates/triggers/activates the reference signal resources as many as the number N of the MAC-CE fields), a first MAC-CE field is associated with a first reference signal resource (e.g., a reference signal resource with the smallest reference signal resource ID; for another example, a first reference signal resource in a reference signal resource set); a second MAC-CE field is associated with a second reference signal resource (e.g., a reference signal resource with the second smallest reference signal resource ID; for another example, a second reference signal resource in the reference signal resource set), and so on. Optionally, the number of the one or more MAC-CE fields is greater than or equal to the number of the one or more reference signal resources. Optionally, the first P MAC-CE fields of the one or more MAC-CE fields are used to indicate first parameters of P reference signal resources of the corresponding reference signal resource set, wherein P represents the number of the reference signal resources for the CSI reports indicated/triggered/activated by the MAC-CE. For example, the MAC-CE includes N MAC-CE fields and the MAC-CE triggers/activates the reference signal resource set associated with P reference signal resources (e.g., P is less than or equal to N), a first MAC-CE field is associated with a first reference signal resource (e.g., a reference signal resource with the smallest reference signal resource ID; for another example, a first reference signal resource in a reference signal resource set); a second MAC-CE field is associated with a second reference signal resource (e.g., a reference signal resource with a second smallest reference signal resource ID; for another example, a second reference signal resource in the reference signal resource set), and so on. Optionally, reference signal resources indicated/triggered/activated by the MAC-CE may be (all) aperiodic reference signal resources, or may be (all) semi-persistent reference signal resources, or may be (all) periodic reference signal resources. Optionally, the reference signal resource (set) configuration IDs include semi-persistent reference signal resource (set) configuration IDs. Optionally, the reference signal resource (set) configuration IDs include aperiodic reference signal resource (set) configuration IDs. Optionally, the reference signal resource (set) configuration IDs include periodic reference signal resource (set) configuration IDs.

Method III

The MAC-CE indicates or triggers or activates one or more reference signal resource sets and each reference signal resource set is associated with one or more reference signal resources. Optionally, the MAC-CE includes one or more fields. Optionally, the one or more MAC-CE fields are in one-to-one correspondence with the one or more reference signal resources associated with the one or more reference signal resource sets. This method is a combination of the above-described Method I and Method II for determining the mapping relationship between one or more fields for indicating the first information and the reference signal resources (or reference signal resource sets) indicated by the third information. Optionally, the first P MAC-CE fields of the one or more MAC-CE fields are associated with a first reference signal resource (e.g., reference signal resources in a reference signal resource set with the smallest reference signal resource set ID), and the association method is as shown in Method II. Optionally, P+1 to 2P MAC-CE fields of the one or more MAC-CE fields are associated with a second reference signal resource set (e.g., reference signal resources in a reference signal resource set with the second smallest reference signal resource set ID), and so on. Optionally, reference signal resources indicated/triggered/activated by the MAC-CE may be (all) aperiodic reference signal resources (sets), or may be (all) semi-persistent reference signal resources (sets), or may be (all) periodic reference signal resources (sets). Optionally, the reference signal resource configuration IDs include semi-persistent reference signal resource configuration IDs. Optionally, the reference signal resource (set) configuration IDs include aperiodic reference signal resource (set) configuration IDs. Optionally, the reference signal resource (set) configuration IDs include periodic reference signal resource (set) configuration IDs.

Optionally, after the UE receives the MAC-CE (e.g., MAC-CE for activation) (Optionally, and when the UE transmits PUCCH with HARQ-ACK information in a slot n corresponding to PDSCH carrying an activation command, starting from a first slot after slot $$n+3N_{slot}^{subframe,\mu}$$

(Optionally, the SCS of the first slot is determined according to the SCS of a time resource indicated by the MAC-CE)), the UE applies/uses the indication (e.g., (the second parameter indicated by) the fourth information and/or the third information) of the MAC-CE. Optionally, μ is the SCS configuration of the PUCCH.

Optionally, after the UE receives the MAC-CE (e.g., MAC-CE for deactivation) (Optionally, and when the UE transmits PUCCH with HARQ-ACK information in a slot n corresponding to PDSCH carrying an activation command, starting from a first slot after slot $$n+3N_{slot}^{subframe,\mu}$$

(here, $$N_{slot}^{subframe,\mu}$$

is a number of slots per subframe for SCS configuration u of the PUCCH transmission) (μ is the SCS configuration of PUCCH) (Optionally, the SCS of the first slot is determined according to the SCS of a time resource indicated by the MAC-CE)), the UE stops applying/using the indication (e.g., (the second parameter indicated by) the fourth information and/or the third information) of the MAC-CE. Optionally, μ is the SCS configuration of the PUCCH. The advantage of this method is that the base station dynamically indicates or updates the parameter of a reference signal resource so as to flexibly obtain a CSI feedback based on the corresponding reference signal resource, improving the system flexibility.

For the signaling (e.g., DCI or MAC-CE signaling) for indicating/triggering a CSI report and/or a reference signal resource described in the foregoing embodiments, there may be a case wherein more than one CSI report and/or reference signal resource having a same signaling indication exists. In this case, it needs to define a priority and/or an overriding rule of such signaling; otherwise, the corresponding UE's behaviors are unclear. Definition methods are as follows.

The UE receives first signaling for indicating a parameter of a CSI report (configuration) and/or a reference signal resource (set), and the UE further receives second signaling for indicating the parameter of the CSI report (configuration) and/or the reference signal resource (set). When the priority of the first signaling is higher than the priority of the second signaling, the UE utilizes the first signaling (or, the UE utilizes information indicated by the first signaling; or, the UE determines a CSI parameter or reports a CSI report according to the first signaling). When the priority of the first signaling is lower than the priority of the second signaling, the UE utilizes the second signaling (or, the UE utilizes information indicated by the second signaling; or, the UE determines a CSI parameter or reports a CSI report according to the second signaling). Optionally, the definition methods/determination methods for the priority of signaling are as follows.

Method I

The priority of signaling is related to a type of a CSI report indicated/triggered by the signaling. For example, the type of the CSI report may be periodic CSI report, semi-persistent CSI report, or aperiodic CSI report. The priorities are, for example, from high to low as follows: aperiodic CSI report>semi-persistent CSI report>periodic CSI report. For example, the type of the CSI report may be semi-persistent CSI report or aperiodic CSI report. The priorities are, for example, from high to low as follows: aperiodic CSI report>semi-persistent CSI report.

Method II

The priority of signaling is related to a type of the signaling. For example, the type of the signaling may be DCI or MAC-CE or RRC. For example, the priorities are, for example, from high to low as follows: DCI>MAC-CE>RRC. For example, the type of the signaling is DCI or MAC-CE. For example, the priorities are, for example, from high to low as follows: DCI>MAC-CE.

Method III

The priority of signaling is related to a sequential order that the signaling is received by the UE. For example, when the time the UE receives first signaling is later than the time the UE receives second information, the priority of the first signaling is higher than that of the second signaling. For another example, when the time the UE receives first signaling is earlier than the time the UE receives second information, the priority of the first signaling is higher than that of the second signaling.

Method IV

The priority of signaling is related to whether the signaling triggers/indicates a CSI report or a reference signal resource. For example, when first signaling triggers/indicates a CSI report and second signaling triggers/indicates a reference signal resource, the priority of the first signaling is higher than that of the second signaling. For example, when the first signaling triggers/indicates the CSI report and the second signaling triggers/indicates the reference signal resource, the priority of the first signaling is lower than that of the second signaling.

Method V

The priority of signaling is related to a type of a reference signal resource indicated/triggered by the signaling. Optionally, the type of the reference signal resource may be periodic reference signal resource, semi-persistent reference signal resource, or aperiodic reference signal resource. The priorities are, for example, from high to low as follows: aperiodic reference signal resource>semi-persistent reference signal resource>periodic reference signal resource. For example, the type of the reference signal resource may be semi-persistent reference signal resource or aperiodic reference signal resource. The priorities are, for example, from high to low as follows: aperiodic reference signal resource>semi-persistent reference signal resource.

It needs to be noted that the methods for determining the priorities described above may be combined. For example, a terminal device firstly determines a priority relationship between the first signaling and the second signaling by method I. If the priority relationship between the first signaling and the second signaling cannot be determined by method I (e.g., the CSI reports indicated/triggered by the first signaling and the second signaling are the same in type), the priority relationship between the first signaling and the second signaling may be determined by method II. If the priority relationship between the first signaling and the second signaling cannot be determined by method II too (e.g., the first signaling and the second signaling are the same in signaling type), the priority relationship between the first signaling and the second signaling may be determined by method III. Other combinations may be possible.

Figure 5A:
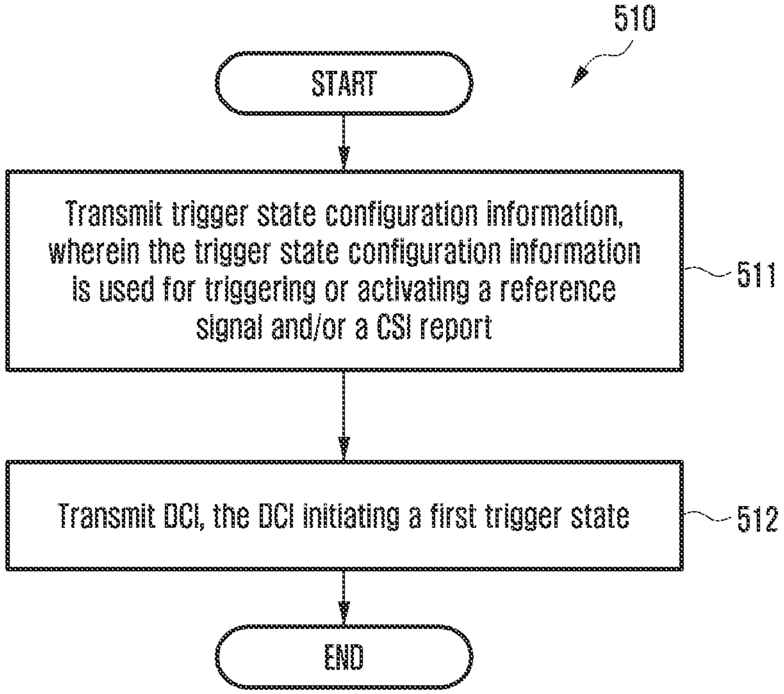
FIG. 5A illustrates a method performed by a base station according to various embodiments of the disclosure.

FIG. 5A illustrates a method 510 performed by a base station according to an embodiment of the disclosure. The method 510 includes that: the base station transmits trigger state configuration information to a UE at 511, wherein the trigger state configuration information is used for triggering or activating a reference signal and/or a CSI report; and the base station transmits DCI to the UE at 512, wherein the DCI initiates a first trigger state.

Figure 5B:
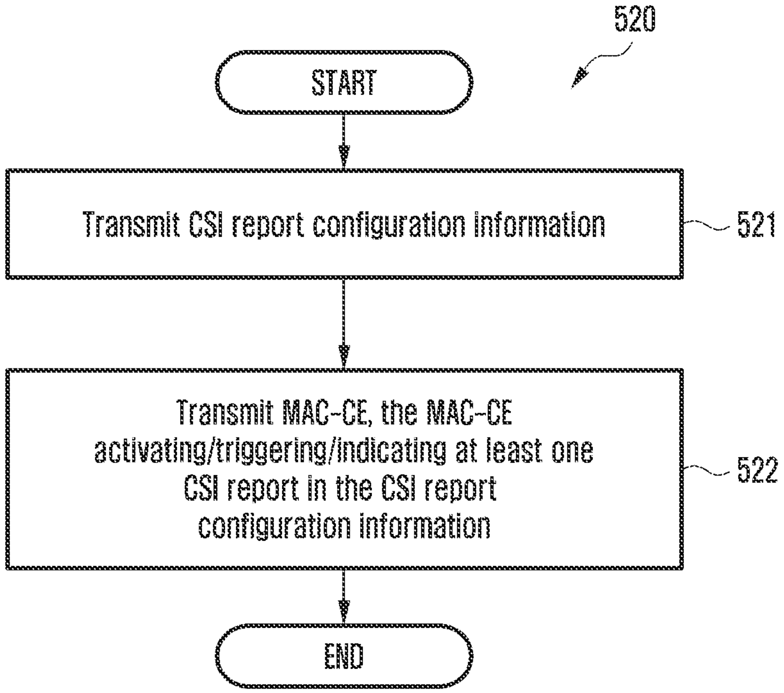
FIG. 5B illustrates a method performed by a base station according to various embodiments of the disclosure.

FIG. 5B illustrates a method 520 performed by a base station according to an embodiment of the disclosure. The method 520 includes that: the base station transmits CSI report configuration information to a UE at 521; and the base station transmits MAC-CE to the UE at 522, wherein the MAC-CE activates/triggers/indicates at least one CSI report (configured) in the CSI report configuration information.

Figure 5C:
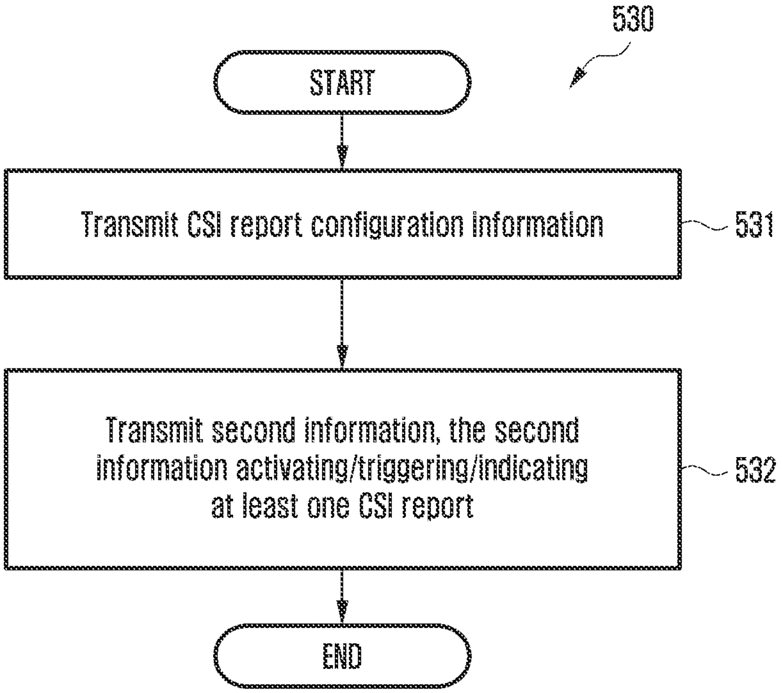
FIG. 5C illustrates a method performed by a base station according to various embodiments of the disclosure.

FIG. 5C illustrates a method 530 performed by a base station according to an embodiment of the disclosure. The method 530 includes that: the base station transmits CSI report configuration information to a UE at 531; and the base station transmits second information to the UE at 532, wherein the second information activates/triggers/indicates at least one CSI report (in the CSI report configuration information).

Figure 5D:
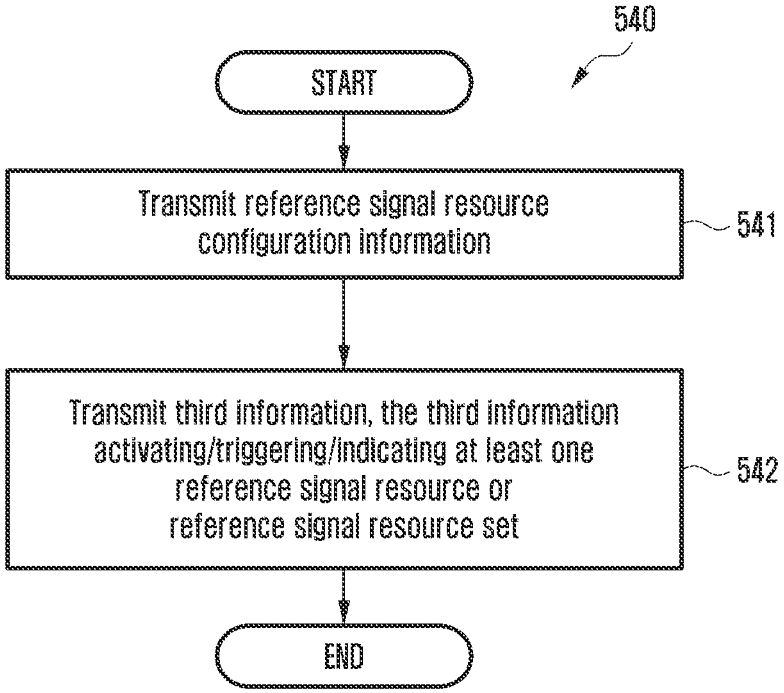
FIG. 5D illustrates a method performed by a base station according to various embodiments of the disclosure.

FIG. 5D illustrates a method 540 performed by a base station according to an embodiment of the disclosure. The method 540 includes that: the base station transmits reference signal resource configuration information to a UE at 541; and the base station transmits third information to the UE at 542, wherein the third information activates/triggers/indicates at least one reference signal resource or reference signal resource set (in the reference signal resource configuration information).

According to an embodiment, a method performed by a user equipment (UE) in a wireless communication system is provided.

According to an embodiment, the method includes determining first information; determining a CSI parameter or reporting CSI based on a first parameter associated with a channel state information (CSI) report, wherein the first parameter is based on the first information; wherein the first information comprises at least one of: power associated information, spatial domain associated information, frequency-domain associated information, information for indicating a channel quality indicator (CQI) table, information for indicating a layer 1-reference signal receiving power (L1-RSRP) table, information for indicating layer 1-signal to interference plus noise ratio (L1-SINR) table, measurement associated information, and information for indicating a CSI report container.

According to an embodiment, wherein the determining first information comprises: receiving second configuration information, wherein the second configuration information comprises the first information; and receiving downlink control information (DCI), wherein the DCI initiates a first trigger state, wherein the first trigger state corresponds to the second configuration information.

According to an embodiment, wherein the first trigger state triggers or activates the CSI report.

According to an embodiment, wherein the determining first information comprises: receiving signaling associated with the first information.

According to an embodiment, the method further comprising: receiving information for configuring a CSI report, wherein the signaling is associated with second information; and the CSI report is determined by the second information based on the information for configuring a CSI report.

According to an embodiment, wherein the first parameter being based on the first information comprises that: the first parameter is indicated or updated by the first information.

According to an embodiment, the method further comprising: receiving first configuration information, wherein the first parameter is indicated or updated by the first information based on the first configuration information.

According to an embodiment, wherein: the first configuration information is associated with at least one of: a cell and/or component carrier (CC) group; a cell and/or CC; a bandwidth part (BWP); a reference signal resource; a reference signal resource set; and the CSI report.

According to an embodiment, wherein the first parameter comprises a parameter of a reference signal resource or reference signal resource set associated with the CSI report.

According to an embodiment, wherein the reference signal resource associated with the CSI report comprises a reference signal resource for channel measurement and/or a reference signal resource for interference measurement.

According to an embodiment, wherein the reference signal resource set associated with the CSI report comprises a reference signal resource set for channel measurement and/or a reference signal resource set for interference measurement.

According to an embodiment, wherein the spatial domain associated information comprises codebook information and/or a reference signal port parameter.

According to an embodiment, wherein the frequency-domain associated information comprises frequency-domain information for CSI reporting and/or frequency-domain information for a measurement resource.

According to an embodiment, a method performed by a user equipment (UE) in a wireless communication system is provided.

According to an embodiment, the method includes: determining fourth information; determining a channel state information (CSI) parameter by applying a second parameter associated with a reference signal resource or based on the second parameter, wherein the second parameter is based on the fourth information; wherein the fourth information comprises at least one of: power associated information, spatial domain associated information, frequency-domain associated information, information for indicating a channel quality indicator (CQI) table, information for indicating a layer 1-reference signal receiving power (L1-RSRP) table, information for indicating layer 1-signal to interference plus noise ratio (L1-SINR) table, measurement associated information, and information for indicating a CSI report container.

According to an embodiment, a method performed by a base station in a wireless communication system is provided.

According to an embodiment, the method includes transmitting second configuration information, wherein the second configuration information comprises first information; and receiving a channel state information (CSI) report, wherein a first parameter associated with the CSI report is based on the first information, and the first information comprises at least one of: power associated information, spatial domain associated information, frequency-domain associated information, information for indicating a channel quality indicator (CQI) table, information for indicating a layer 1-reference signal receiving power (L1-RSRP) table, information for indicating layer 1-signal to interference plus noise ratio (L1-SINR) table, measurement associated information, and information for indicating a CSI report container.

According to an embodiment, a method performed by a user equipment (UE) in a communication system is provided.

According to an embodiment, the method includes receiving, via higher layer signaling, a channel state information (CSI) report configuration list including at least one CSI report configuration; receiving a medium access control (MAC) control element (CE) including first information for activation/deactivation respectively of a plurality of configurations included in a CSI report configuration corresponding to the first information among the at least one CSI report configuration; and transmitting, on a physical uplink control channel (PUCCH), a CSI report including a CSI parameter based on a configuration activated by the first information.

According to an embodiment, wherein the MAC CE further includes second information for activation/deactivation respectively of the at least one CSI report configuration.

According to an embodiment, wherein the first information is at least one first field.

According to an embodiment, wherein a first field among the at least one field is included in the MAC CE in case that a CSI report configuration corresponding to the first field is activated by the second information.

According to an embodiment, wherein the MAC CE further includes a 5-bit serving cell field indicating a serving cell for which the MAC CE is applied and a 2-bit bandwidth part (BWP) field indicating an uplink BWP for which the MAC CE is applied.

According to an embodiment, wherein the second information is at least one second field indicating activation/deactivation of the at least one CSI report configuration.

According to an embodiment, wherein an i-th second field of the at least one second field corresponds to a CSI report configuration which includes PUCCH resources for semi-persistent CSI reporting in the uplink BWP and has an i-th lowest CSI report configuration identifier within the CSI report configuration list with type set to semiPersistentOnPUCCH.

According to an embodiment, wherein in case that the configuration includes a power offset adjustment parameter, the CSI parameter is determined based on the power offset adjustment parameter in addition to a power control offset parameter for a physical downlink shared channel (PDSCH) resource element (RE) and a non-zero power CSI reference signal (CSI-RS RE).

According to an embodiment, wherein in case that the configuration includes a port parameter bitmap including a certain number of bits mapped to the certain number of CSI-RS ports according to increasing order of values of the CSI-RS ports, the CSI parameter is determined based on at least one CSI-RS ports indicated by the port parameter bitmap.

According to an embodiment, a user equipment (UE) in a communication system is provided.

According to an embodiment, the UE includes a transceiver; and a processor coupled with the transceiver and configured to: receive, via higher layer signaling, a channel state information (CSI) report configuration list including at least one CSI report configuration; receive a medium access control (MAC) control element (CE) including first information for activation/deactivation respectively of a plurality of configurations included in a CSI report configuration corresponding to the first information among the at least one CSI report configuration; and transmit, on a physical uplink control channel (PUCCH), a CSI report including a CSI parameter based on a configuration activated by the first information.

According to an embodiment, a method performed by a base station in a communication system is provided.

According to an embodiment, the method includes transmitting, via higher layer signaling, a channel state information (CSI) report configuration list including at least one CSI report configuration; transmitting a medium access control (MAC) control element (CE) including first information for activation/deactivation respectively of a plurality of configurations included in a CSI report configuration corresponding to the first information among the at least one CSI report configuration; and receiving, on a physical uplink control channel (PUCCH), a CSI report including a CSI parameter associated with a configuration activated by the first information.

According to an embodiment, wherein the MAC CE further includes second information for activation/deactivation respectively of the at least one CSI report configuration.

According to an embodiment, wherein the first information is at least one first field.

According to an embodiment, wherein a first field among the at least one field is included in the MAC CE in case that a CSI report configuration corresponding to the first field is activated by the second information.

According to an embodiment, wherein the MAC CE further includes a 5-bit serving cell field indicating a serving cell for which the MAC CE is applied and a 2-bit bandwidth part (BWP) field indicating an uplink BWP for which the MAC CE is applied.

According to an embodiment, wherein the second information is at least one second field indicating activation/deactivation of the at least one CSI report configuration.

According to an embodiment, wherein an i-th second field of the at least one second field corresponds to a CSI report configuration which includes PUCCH resources for semi-persistent CSI reporting in the uplink BWP and has an i-th lowest CSI report configuration identifier within the CSI report configuration list with type set to semiPersistentOnPUCCH.

According to an embodiment, wherein in case that the configuration includes a power offset adjustment parameter, the CSI parameter is associated with the power offset adjustment parameter in addition to a power control offset parameter for a physical downlink shared channel (PDSCH) resource element (RE) and a non-zero power CSI reference signal (CSI-RS RE).

According to an embodiment, wherein in case that the configuration includes a port parameter bitmap including a certain number of bits mapped to the certain number of CSI-RS ports according to increasing order of values of the CSI-RS ports, the CSI parameter is associated with at least one CSI-RS ports indicated by the port parameter bitmap.

According to an embodiment, a base station in a communication system is provided.

According to an embodiment, the base station includes a transceiver; and a processor coupled with the transceiver and configured to: transmit, via higher layer signaling, a channel state information (CSI) report configuration list including at least one CSI report configuration; transmit a medium access control (MAC) control element (CE) including first information for activation/deactivation respectively of a plurality of configurations included in a CSI report configuration corresponding to the first information among the at least one CSI report configuration; and receive, on a physical uplink control channel (PUCCH), a CSI report including a CSI parameter associated with a configuration activated by the first information.

Figure 6:
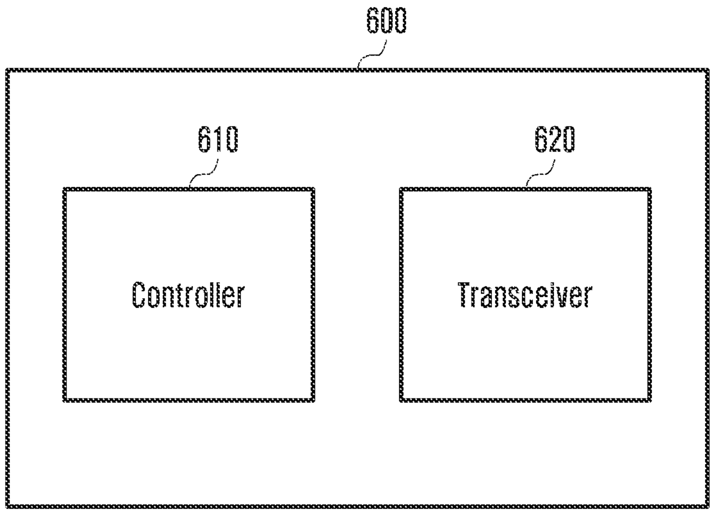
FIG. 6 illustrates a structure of a UE 600 according to an embodiment of the disclosure.

FIG. 6 illustrates a structure of a UE 600 according to an embodiment of the disclosure.

Referring to FIG. 6, the UE 600 includes a controller 610 and a transceiver 620, wherein the controller 610 is configured to perform various methods performed by the UE disclosed above herein, and the transceiver 620 is configured to transmit and receive channels or signals.

Figure 7:
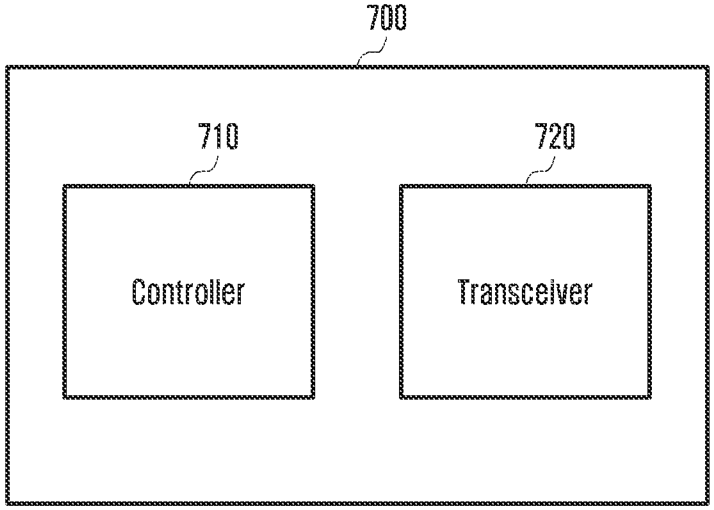
FIG. 7 illustrates a structure 700 of a base station according to an embodiment of the disclosure.

FIG. 7 illustrates a structure 700 of a base station according to an embodiment of the disclosure.

Referring to FIG. 7, a network device 700 includes a controller 710 and a transceiver 720, wherein the controller 710 is configured to perform various methods performed by the network device disclosed above herein, and the transceiver 720 is configured to transmit and receive channels or signals.

In the disclosure, the reference signal resource may be equivalently understood as a reference signal set. The reference signal resource may be equivalently understood as a reference signal resource.

Moreover, "at least one" described in the disclosure includes any and/or possible combinations of the listed items. Various embodiments described in the disclosure and various examples in the embodiments may be changed and combined in any proper way, and "/" used in the disclosure represents "and/or".

Various illustrative logic blocks, modules, and circuits described in the disclosure may be implemented or executed by a general-purpose processor, a digital signal processor (DSP), an application specific integrated circuit (ASIC), a field programmable gate array (FPGA), or other programmable logic devices, discrete gate or transistor logics, discrete hardware components, or any combination designed to perform the functions described herein. The general-purpose processor may be a microprocessor. However, in an alternative, the processor may be any conventional processor, controller, microcontroller, or state machine. The processor may also be implemented as a combination of computing devices, such as a combination of a DSP and a microprocessor, multiple microprocessors, one or more microprocessors cooperating with the DSP core, or any other such configuration.

The steps of the methods or algorithms described in the disclosure may be embodied directly in hardware, in a software module executed by a processor, or in a combination of both. The software modules may reside in RAM memory, flash memory, ROM memory, erasable programmable ROM (EPROM) memory, electrically EPROM (EEPROM) memory, registers, hard disks, removable disks, or any other form of storage medium known in the art. A storage medium is coupled to the processor, so that the processor can read and write information from/to the storage medium. In an alternative, the storage medium may be integrated into the processor. The processor and the storage medium may reside in the ASIC. The ASIC may reside in the user terminal. In the alternative, the processor and the storage medium may reside in the user terminal as discrete components.

In one or more designs, the functions may be implemented in hardware, software, firmware, or any combination thereof. If implemented in software, various functions may be stored on a computer-readable medium as or transmitted by one or more instructions or codes. The computer-readable medium includes both of a computer storage medium and a communication medium, and the latter includes any medium helping transfer of a computer program from one place to another place. The storage medium may be any available medium that can be accessed by a general-purpose or special-purpose computer.

In combination with the accompanying drawings, the descriptions set forth in the disclosure depict example configurations, methods, and apparatus, and do not represent all examples that can be implemented or within the scope of the claims. The term "example" used herein means "serving as an example, instance or illustration" rather than "preferred" or "superior to other examples". The detailed descriptions included specific details intended to provide an understanding of the techniques described. However, these techniques can be practiced without these specific details. In some cases, well-known structures and devices are illustrated in the form of block diagrams to avoid obscuring the concepts of the described examples.

Although the specification includes the details of a plurality of specific implementations, these should not be construed as limitations to any disclosure or the claimed scope, but are descriptions of particular features of particular embodiments of particular disclosures. In the specification, some features described in the context of an individual embodiment may also be implemented in combination in a single embodiment. Rather, various features described in the context of a single embodiment may also be implemented separately in a plurality of embodiments or in any appropriate sub-combination. Moreover, although the features may be described in the context as functioning in some combinations and even initially claimed as such, in some cases, one or more features from the claimed combination may be deleted from the combination, and the claimed combination may be directed to a sub-combination or variations of the sub-combination.

It will be understood that the particular order or hierarchy of steps in the method of the disclosure is description of an example process. Based on design preference, it will be understood that the particular order or hierarchy of steps in the method may be rearranged to realize the functions and effects disclosed herein. The appended method claims elements of various steps in an example order and are not meant to be limited to the presented particular order or hierarchy, unless particularly stated otherwise. Furthermore, although elements may be described or claimed in a singular form, plurals may also be contemplated unless limitations to singular forms are explicitly illustrated. Therefore, the disclosure is not limited to the illustrated examples, and any apparatus for performing the functionals described herein is included in various aspects of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:

receiving, via higher layer signaling, a channel state information (CSI) report configuration list including at least one first CSI report configuration;

receiving a medium access control (MAC) control element (CE), wherein:

the MAC CE includes at least one first field for activation/deactivation respectively of the at least one first CSI report configuration;

in case that the at least one first field activates at least one second CSI report configuration among the at least one first CSI report configuration, the MAC CE includes a plurality of second fields associated with CSI reference signal (CSI-RS) ports for a corresponding second CSI report configuration; and each of the plurality of second fields is for activation/deactivation respectively of a plurality of configurations associated with the CSI-RS ports in the corresponding second CSI report configuration; and transmitting at least one CSI report associated with the at least one second CSI report configuration, wherein each of the at least one CSI report includes at least one CSI parameter determined based on at least one activated configuration among the plurality of configurations in the corresponding second CSI report configuration.

2. The method of claim 1, wherein the MAC CE further includes:

a 5-bit serving cell field indicating a serving cell to which the MAC CE is applied, and a 2-bit bandwidth part (BWP) field indicating an uplink BWP to which the MAC CE is applied, wherein an i-th first field of the at least one first field corresponds to a CSI report configuration which includes physical uplink control channel (PUCCH) resources for semi-persistent CSI reporting in the uplink BWP and has an i-th lowest CSI report configuration identifier within the CSI report configuration list with a type set to semiPersistentOnPUCCH.

3. The method of claim 1, wherein in case that an activated configuration includes a power adjustment parameter, a CSI parameter corresponding to the activated configuration is determined based on a power offset parameter and the power adjustment parameter; and wherein the power offset parameter is for a physical downlink shared channel (PDSCH) resource element (RE) and a non-zero power (NZP) CSI-RS RE.

4. The method of claim 1, wherein each of the plurality of configurations includes a port parameter bitmap including a certain number of bits mapped to the certain number of CSI-RS ports in an increasing order of values of each of the CSI-RS ports, wherein each of the bits indicates whether a corresponding CSI-RS port is used to determine at least one correspond CSI parameter of each of the at least one CSI report, wherein at least one CSI-RS port indicated to determine the at least one corresponding CSI parameter by the bits is renumbered to consecutive antenna ports according to an increasing order of at least one value of the at least one CSI-RS port indicated to determine the at least one corresponding CSI parameter by the bits, and wherein the at least one corresponding CSI parameter is determined based on the at least one renumbered CSI-RS port.

5. The method of claim 1, wherein in case that the at least one first field deactivates at least one third CSI report configuration among the at least one first CSI report configuration, a plurality of second fields for a corresponding third CSI report configuration among the at least one third CSI report configuration are not included in the MAC CE.

6. A user equipment (UE) in a communication system, the UE comprising:

at least one transceiver; and at least one processor coupled with the at least one transceiver and configured to:

receive, via higher layer signaling, a channel state information (CSI) report configuration list including at least one first CSI report configuration;

receive a medium access control (MAC) control element (CE), wherein:

the MAC CE includes at least one first field for activation/deactivation respectively of the at least one first CSI report configuration;

in case that the at least one first field activates at least one second CSI report configuration among the at least one first CSI report configuration, the MAC CE includes a plurality of second fields associated with CSI reference signal (CSI-RS) ports for a corresponding second CSI report configuration; and each of the plurality of second fields is for activation/deactivation respectively of a plurality of configurations associated with the CSI-RS ports in the corresponding second CSI report configuration; and transmit at least one CSI report associated with the at least one second CSI report configuration, wherein each of the at least one CSI report includes at least one CSI parameter determined based on at least one activated configuration among the plurality of configurations in the corresponding second CSI report configuration.

7. The UE of claim 6, wherein the MAC CE further includes:

a 5-bit serving cell field indicating a serving cell to which the MAC CE is applied, and a 2-bit bandwidth part (BWP) field indicating an uplink BWP to which the MAC CE is applied, wherein an i-th first field of the at least one first field corresponds to a CSI report configuration which includes physical uplink control channel PUCCH) resources for semi-persistent CSI reporting in the uplink BWP and has an i-th lowest CSI report configuration identifier within the CSI report configuration list with a type set to semiPersistentOnPUCCH.

8. The UE of claim 6, wherein in case that an activated configuration includes a power adjustment parameter, a CSI parameter corresponding to the activated configuration is determined based on a power offset parameter and the power adjustment parameter, and wherein the power offset parameter is for a physical downlink shared channel (PDSCH) resource element (RE) and a non-zero power (NZP) CSI-RS RE.

9. The UE of claim 6, wherein each of the plurality of configurations includes a port parameter bitmap including a certain number of bits mapped to the certain number of CSI-RS ports in an increasing order of values of each of the CSI-RS ports, wherein each of the bits indicates whether a corresponding CSI-RS port is used to determine at least one corresponding CSI parameter of each of the at least one CSI report, wherein at least one CSI-RS port indicated to determine the at least one corresponding CSI parameter by the bits is renumbered to consecutive antenna ports according to an increasing order of at least one value of the at least one CSI-RS port indicated to determine the at least one corresponding CSI parameter by the bits, and wherein the at least one corresponding CSI parameter is determined based on the at least one renumbered CSI-RS port.

10. The UE of claim 6, wherein in case that the at least one first field deactivates at least one third CSI report configuration among the at least one first CSI report configuration, a plurality of second fields for a corresponding third CSI report configuration among the at least one third CSI report configuration are not included in the MAC CE.

11. A method performed by a base station in a communication system, the method comprising:

transmitting, via higher layer signaling, a channel state information (CSI) report configuration list including at least one first CSI report configuration;

transmitting a medium access control (MAC) control element (CE), wherein:

the MAC CE includes at least one first field for activation/deactivation respectively of the at least one first CSI report configuration;

in case that the at least one first field activates at least one second CSI report configuration among the at least one first CSI report configuration, the MAC CE includes a plurality of second fields associated with CSI reference signal (CSI-RS) ports for a corresponding second CSI report configuration; and each of the plurality of second fields is for activation/deactivation respectively of a plurality of configurations associated with the CSI-RS ports in the corresponding second CSI report configuration; and receiving at least one CSI report associated with the at least one second CSI report configuration, wherein each of the at least one CSI report includes at least one CSI parameter based on at least one activated configuration among the plurality of configurations in the corresponding second CSI report configuration.

12. The method of claim 11, wherein the MAC CE further includes:

a 5-bit serving cell field indicating a serving cell to which the MAC CE is applied, and a 2-bit bandwidth part (BWP) field indicating an uplink BWP to which the MAC CE is applied, wherein an i-th first field of the at least one first field corresponds to a CSI report configuration which includes physical uplink control channel (PUCCH) resources for semi-persistent CSI reporting in the uplink BWP and has an i-th lowest CSI report configuration identifier within the CSI report configuration list with a type set to semiPersistentOnPUCCH.

13. The method of claim 11, wherein in case that an activated configuration includes a power adjustment parameter, a CSI parameter corresponding to the activated configuration is based on a power offset parameter and the power adjustment parameter; and wherein the power offset parameter is for a physical downlink shared channel (PDSCH) resource element (RE) and a non-zero power (NZP) CSI-RS RE.

14. The method of claim 11, wherein each of the plurality of configurations includes a port parameter bitmap including a certain number of bits mapped to the certain number of CSI-RS ports in an increasing order of values of each of the CSI-RS ports, wherein each of the bits indicates whether at least one corresponding CSI parameter of each of the at least one CSI report is based on a corresponding CSI-RS port, wherein at least one CSI-RS port on which the at least one corresponding CSI parameter is based as indicated by the bits is mapped to consecutive antenna ports according to an increasing order of at least one value of the at least one CSI-RS port, and wherein the at least one corresponding CSI parameter is based on the at least one mapped CSI-RS port.

15. The method of claim 11, wherein in case that the at least one first field deactivates at least one third CSI report configuration among the at least one first CSI report configuration, a plurality of second fields for a corresponding third CSI report configuration among the at least one third CSI report configuration are not included in the MAC CE.

16. A base station in a communication system, the base station comprising:

at least one transceiver; and at least one processor coupled with the at least one transceiver and configured to:

transmit, via higher layer signaling, a channel state information (CSI) report configuration list including at least one first CSI report configuration;

transmit a medium access control (MAC) control element (CE), wherein:

the MAC CE includes at least one first field for activation/deactivation respectively of the at least one first CSI report configuration;

in case that the at least one first field activates at least one second CSI report configuration among the at least one first CSI report configuration, the MAC CE includes a plurality of second fields associated with CSI reference signal (CSI-RS) ports for a corresponding second CSI report configuration; and each of the plurality of second fields is for activation/deactivation respectively of a plurality of configurations associated with the CSI-RS ports in the corresponding second CSI report configuration; and receive at least one CSI report associated with the at least one second CSI report configuration, wherein each of the at least one CSI report includes at least one CSI parameter based on at least one activated configuration among the plurality of configurations in the corresponding second CSI report configuration.

17. The base station of claim 16, wherein the MAC CE further includes:

a 5-bit serving cell field indicating a serving cell to which the MAC CE is applied, and a 2-bit bandwidth part (BWP) field indicating an uplink BWP to which the MAC CE is applied, wherein an i-th first field of the at least one first field corresponds to a CSI report configuration which includes physical uplink control channel (PUCCH) resources for semi-persistent CSI reporting in the uplink BWP and has an i-th lowest CSI report configuration identifier within the CSI report configuration list with a type set to semiPersistentOnPUCCH.

18. The base station of claim 16, wherein in case that an activated configuration includes a power adjustment parameter, a CSI parameter corresponding to the activated configuration is based on a power offset parameter and the power adjustment parameter, and wherein the power offset parameter is for a physical downlink shared channel (PDSCH) resource element (RE) and a non-zero power (NZP) CSI-RS RE.

19. The base station of claim 16, wherein each of the plurality of configurations includes a port parameter bitmap including a certain number of bits mapped to the certain number of CSI-RS ports in an increasing order of values of each of the CSI-RS ports, wherein each of the bits indicates whether at least one corresponding CSI parameter of each of the at least one CSI report is based on a corresponding CSI-RS port, wherein at least one CSI-RS port on which the at least one corresponding CSI parameter is based as indicated by the bits is mapped to consecutive antenna ports according to an increasing order of at least one value of the at least one CSI-RS port, and wherein the at least one corresponding CSI parameter is based on the at least one mapped CSI-RS port.

20. The base station of claim 16, wherein in case that the at least one first field deactivates at least one third CSI report configuration among the at least one first CSI report configuration, a plurality of second fields for a corresponding third CSI report configuration among the at least one third CSI report configuration are not included in the MAC CE.

* * * * *